United States Patent
Luckevich et al.

(10) Patent No.: US 10,520,952 B1
(45) Date of Patent: Dec. 31, 2019

(54) DEVICES, SYSTEMS, AND METHODS FOR TRANSMITTING VEHICLE DATA

(71) Applicant: Peloton Technology, Inc., Mountain View, CA (US)

(72) Inventors: Mark S. Luckevich, San Jose, CA (US); Shad M. Laws, Palo Alto, CA (US); Joshua P. Switkes, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 0 days.

(21) Appl. No.: 16/010,368

(22) Filed: Jun. 15, 2018

Related U.S. Application Data

(60) Continuation-in-part of application No. 15/607,316, filed on May 26, 2017, now Pat. No. 10,281,927.
(Continued)

(51) Int. Cl.
    *G05D 1/02*     (2006.01)
    *B60W 10/06*     (2006.01)
(Continued)

(52) U.S. Cl.
    CPC ........... *G05D 1/0289* (2013.01); *B60W 10/06* (2013.01); *B60W 10/08* (2013.01); *B60W 10/18* (2013.01);
(Continued)

(58) Field of Classification Search
    CPC .. G05D 1/0289; G05D 1/0295; G05D 1/0285; G05D 1/0297; B60W 30/165;
(Continued)

(56) References Cited

U.S. PATENT DOCUMENTS

| | | |
|---|---|---|
| 3,725,921 A | 4/1973 | Weidman et al. |
| 5,166,881 A | 11/1992 | Akasu |

(Continued)

FOREIGN PATENT DOCUMENTS

| | | |
|---|---|---|
| EP | 0982173 A2 | 3/2000 |
| EP | 0991046 A1 | 4/2000 |

(Continued)

OTHER PUBLICATIONS

"Automated Highway System: Milestone 2 Report, Task C2: Downselect System Configurations and Workshop #3" (National Automated Highway System Consortium, Troy, MI, Jun. 1997), 604 pages.

(Continued)

*Primary Examiner* — Rodney A Butler

(57) ABSTRACT

Systems and methods for coordinating and controlling vehicles, for example heavy trucks, to follow closely behind each other, or linking to form a platoon. In one aspect, on-board controllers in each vehicle interact with vehicular sensors to monitor and control, for example, relative distance, relative acceleration or deceleration, and speed. In some aspects, a lead vehicle can wirelessly transmit information from various electronic control units (ECUs) to ECUs in a rear vehicle. A rear vehicle can then apply transformations to the information to account for a desired following distance and a time offset. ECUs onboard the rear vehicle may then be controlled based on the ECUs of the lead vehicle, the desired following distance, and the time offset.

19 Claims, 9 Drawing Sheets

Related U.S. Application Data which is a continuation of application No. 14/292,583, filed on May 30, 2014, now Pat. No. 9,665,102, which is a division of application No. 13/542,622, filed on Jul. 5, 2012, now Pat. No. 8,744,666, said application No. 14/292,583 is a division of application No. 13/542,627, filed on Jul. 5, 2012, now Pat. No. 9,582,006.

(60) Provisional application No. 61/505,076, filed on Jul. 6, 2011.

(51) Int. Cl.
*B60W 10/18* (2012.01)
*B60W 10/08* (2006.01)
*B60W 30/16* (2012.01)
*B60W 30/165* (2012.01)

(52) U.S. Cl.
CPC ......... *B60W 30/165* (2013.01); *G05D 1/0285* (2013.01); *G05D 1/0295* (2013.01); *G05D 1/0297* (2013.01); *B60W 2520/10* (2013.01); *B60W 2520/40* (2013.01); *B60W 2550/308* (2013.01); *B60W 2550/404* (2013.01); *B60W 2720/10* (2013.01); *B60W 2720/40* (2013.01)

(58) Field of Classification Search
CPC ...... B60W 10/18; B60W 10/06; B60W 10/08; B60W 2720/10; B60W 2550/404; B60W 2520/10; B60W 2520/40; B60W 2550/308; B60W 2720/40
See application file for complete search history.

(56) References Cited

U.S. PATENT DOCUMENTS

| | | |
|---|---|---|
| 5,295,551 A | 3/1994 | Sukonick |
| 5,331,561 A | 7/1994 | Barrett et al. |
| 5,572,449 A | 11/1996 | Tang et al. |
| 5,633,456 A | 5/1997 | Stander |
| 5,680,122 A | 10/1997 | Mio |
| 5,777,451 A | 7/1998 | Kobayashi et al. |
| 5,781,119 A | 7/1998 | Yamashita et al. |
| 5,815,825 A | 9/1998 | Tachibana et al. |
| 6,032,097 A | 2/2000 | Iihoshi et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,345,603 B1 | 2/2002 | Abboud et al. |
| 6,356,820 B1 | 3/2002 | Hashimoto et al. |
| 6,397,149 B1 | 5/2002 | Hashimoto |
| 6,418,370 B1 | 7/2002 | Isogai et al. |
| 6,484,078 B1 | 11/2002 | Kageyama |
| 6,510,381 B2 | 1/2003 | Grounds et al. |
| 6,633,006 B1 | 10/2003 | Wolf et al. |
| 6,879,910 B2 | 4/2005 | Shike et al. |
| 6,963,795 B2 | 11/2005 | Haissig et al. |
| 7,286,825 B2 | 10/2007 | Shishido et al. |
| 7,554,435 B2 | 6/2009 | Tengler et al. |
| 7,593,811 B2 | 9/2009 | Schmidt et al. |
| 7,596,811 B2 | 9/2009 | Lloyd et al. |
| 7,729,823 B2 | 6/2010 | Ruoppolo |
| 7,782,227 B2 | 8/2010 | Boss et al. |
| 7,894,982 B2 | 2/2011 | Reeser et al. |
| 8,026,833 B2 | 9/2011 | Villaume et al. |
| 8,073,574 B2 | 12/2011 | Yamamoto et al. |
| 8,116,921 B2 | 2/2012 | Ferrin et al. |
| 8,139,109 B2 | 3/2012 | Schmiedel et al. |
| 8,224,551 B2 | 7/2012 | Grolle et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,442,735 B2 | 5/2013 | Hrovat et al. |
| 8,538,656 B2 | 9/2013 | Yamashiro |
| 8,620,517 B2 | 12/2013 | Caveney et al. |
| 8,660,779 B2 | 2/2014 | Shida |
| 8,666,587 B2 | 3/2014 | Anderson |
| 8,676,466 B2 | 3/2014 | Mudalige |
| 8,682,511 B2 | 3/2014 | Andreasson |
| 8,688,349 B2 | 4/2014 | Grolle et al. |
| 8,738,238 B2 | 5/2014 | Rekow |
| 8,744,666 B2 | 6/2014 | Switkes et al. |
| 8,775,060 B2 | 7/2014 | Solyom et al. |
| 8,798,907 B2 | 8/2014 | Shida |
| 8,922,391 B2 | 12/2014 | Rubin et al. |
| 8,947,531 B2 | 2/2015 | Fischer et al. |
| 8,948,995 B2 | 2/2015 | Pandita et al. |
| 9,037,389 B2 | 5/2015 | You |
| 9,079,587 B1 | 7/2015 | Rupp et al. |
| 9,141,112 B1 | 9/2015 | Loo et al. |
| 9,145,137 B2 | 9/2015 | Doi et al. |
| 9,224,300 B2 | 12/2015 | Lee et al. |
| 9,355,423 B1 | 5/2016 | Slusar |
| 9,367,065 B2 | 6/2016 | Dolgov et al. |
| 9,396,661 B2 | 7/2016 | Okamoto |
| 9,423,794 B2 | 8/2016 | Lind et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,616,743 B1 | 4/2017 | Mays et al. |
| 9,632,507 B1 | 4/2017 | Korn |
| 9,645,579 B2 | 5/2017 | Switkes et al. |
| 9,665,102 B2 | 5/2017 | Switkes et al. |
| 9,721,474 B2 | 8/2017 | Eskilson |
| 9,771,070 B2 | 9/2017 | Zagorski et al. |
| 9,799,224 B2 | 10/2017 | Okamoto |
| 9,823,166 B2 | 11/2017 | Dudar et al. |
| 9,878,657 B2 | 1/2018 | Wunsche, III |
| 9,927,816 B2 | 3/2018 | Li et al. |
| 9,928,746 B1 | 3/2018 | MacNeille et al. |
| 9,940,840 B1 | 4/2018 | Schubert |
| 10,013,877 B2 | 7/2018 | Lu et al. |
| 10,017,039 B1 * | 7/2018 | Colavincenzo ......... B60K 6/22 |
| 10,017,179 B2 | 7/2018 | Alden et al. |
| 10,027,024 B2 | 7/2018 | Powell |
| 10,031,522 B2 | 7/2018 | Moran et al. |
| 10,042,365 B2 | 8/2018 | Switkes et al. |
| 10,074,894 B1 | 9/2018 | Birnbaum et al. |
| 2002/0077748 A1 | 6/2002 | Nakano |
| 2002/0152015 A1 | 10/2002 | Seto |
| 2002/0198632 A1 | 12/2002 | Breed et al. |
| 2004/0078133 A1 | 4/2004 | Miller et al. |
| 2004/0140143 A1 | 7/2004 | Saeki et al. |
| 2006/0074557 A1 | 4/2006 | Mulligan et al. |
| 2006/0095195 A1 | 5/2006 | Nishimura et al. |
| 2006/0106534 A1 | 5/2006 | Kawamata et al. |
| 2006/0161341 A1 | 7/2006 | Haegebarth et al. |
| 2006/0229804 A1 | 10/2006 | Schmidt et al. |
| 2007/0027614 A1 | 2/2007 | Reeser et al. |
| 2007/0043502 A1 | 2/2007 | Mudalige et al. |
| 2007/0060045 A1 | 3/2007 | Prautzsch |
| 2007/0213915 A1 | 9/2007 | Tange et al. |
| 2007/0233337 A1 | 10/2007 | Plishner |
| 2007/0276597 A1 | 11/2007 | Kato et al. |
| 2008/0009985 A1 | 1/2008 | Plishner |
| 2008/0059007 A1 | 3/2008 | Whittaker et al. |
| 2008/0249667 A1 | 3/2008 | Horvitz et al. |
| 2009/0012666 A1 | 1/2009 | Simpson et al. |
| 2009/0062974 A1 | 1/2009 | Tamamoto et al. |
| 2009/0079839 A1 | 3/2009 | Fischer et al. |
| 2009/0157461 A1 | 6/2009 | Wright et al. |
| 2009/0164082 A1 | 6/2009 | Kobayashi et al. |
| 2009/0222186 A1 | 9/2009 | Jensen |
| 2009/0287412 A1 | 11/2009 | Menzel et al. |
| 2010/0049374 A1 | 2/2010 | Ferrin et al. |
| 2010/0094509 A1 | 4/2010 | Lüke et al. |
| 2010/0250088 A1 | 9/2010 | Grolle et al. |
| 2010/0256835 A1 | 10/2010 | Mudalige |
| 2010/0256836 A1 | 10/2010 | Mudalige |

(56) References Cited

U.S. PATENT DOCUMENTS

| | | |
|---|---|---|
| 2010/0256852 A1 | 10/2010 | Mudalige |
| 2010/0332101 A1 | 12/2010 | Braunberger et al. |
| 2011/0010022 A1 | 1/2011 | Beavin |
| 2011/0083011 A1 | 4/2011 | DiCrescenzo |
| 2011/0112730 A1 | 5/2011 | Rekow |
| 2011/0118967 A1 | 5/2011 | Tsuda |
| 2011/0184596 A1 | 7/2011 | Andreasson |
| 2011/0184605 A1 | 7/2011 | Neff |
| 2011/0222730 A1 | 9/2011 | Steinberg et al. |
| 2011/0270514 A1 | 11/2011 | Shida |
| 2011/0270520 A1 | 11/2011 | Kronenberg |
| 2011/0301779 A1 | 12/2011 | Shida |
| 2012/0109421 A1 | 5/2012 | Scarola |
| 2012/0123660 A1 | 5/2012 | Kagawa |
| 2012/0239268 A1 | 9/2012 | Chen et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2013/0015984 A1 | 1/2013 | Yamashiro |
| 2013/0024084 A1 | 1/2013 | Yamashiro |
| 2013/0030606 A1 | 1/2013 | Mudalige et al. |
| 2013/0041567 A1* | 2/2013 | Yamashiro ............... B60T 7/22  701/96 |
| 2013/0041576 A1* | 2/2013 | Switkes ............... G08G 1/166  701/123 |
| 2013/0066511 A1 | 3/2013 | Switkes et al. |
| 2013/0079953 A1 | 3/2013 | Kumabe |
| 2013/0080040 A1 | 3/2013 | Kumabe |
| 2013/0080041 A1 | 3/2013 | Kumabe |
| 2013/0116861 A1 | 5/2013 | Nemoto |
| 2013/0124064 A1 | 5/2013 | Nemoto |
| 2013/0144465 A1 | 6/2013 | Shida |
| 2013/0144502 A1 | 6/2013 | Shida |
| 2013/0151058 A1 | 6/2013 | Zagorski et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0317676 A1 | 11/2013 | Cooper et al. |
| 2013/0325306 A1 | 12/2013 | Caveney et al. |
| 2014/0005906 A1 | 1/2014 | Pandita et al. |
| 2014/0019031 A1 | 1/2014 | Solyom et al. |
| 2014/0067220 A1 | 3/2014 | Seiler |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0145838 A1 | 5/2014 | Tuukkanen |
| 2014/0148994 A1 | 5/2014 | Ando |
| 2014/0172265 A1 | 6/2014 | Funabashi |
| 2014/0197967 A1 | 7/2014 | Modica et al. |
| 2014/0236449 A1 | 8/2014 | Horn |
| 2014/0244144 A1 | 8/2014 | You |
| 2014/0297063 A1 | 10/2014 | Shida |
| 2014/0303870 A1 | 10/2014 | Switkes et al. |
| 2014/0309836 A1 | 10/2014 | Ollis |
| 2014/0316671 A1 | 10/2014 | Okamoto |
| 2014/0316865 A1 | 10/2014 | Okamoto |
| 2015/0045993 A1 | 2/2015 | Cooper et al. |
| 2015/0100192 A1 | 4/2015 | Lee et al. |
| 2015/0120137 A1 | 4/2015 | Zeng et al. |
| 2015/0151737 A1 | 6/2015 | Birch et al. |
| 2015/0153733 A1 | 6/2015 | Ohmura et al. |
| 2015/0161894 A1 | 6/2015 | Duncan et al. |
| 2015/0262481 A1 | 9/2015 | Selin |
| 2015/0296019 A1 | 10/2015 | Onishi et al. |
| 2015/0314790 A1 | 11/2015 | Deragarden |
| 2016/0009284 A1 | 1/2016 | Tokimasa et al. |
| 2016/0019782 A1 | 1/2016 | Alam et al. |
| 2016/0026187 A1 | 1/2016 | Alam et al. |
| 2016/0054735 A1* | 2/2016 | Switkes ............... G08G 1/22  701/23 |
| 2016/0267796 A1 | 9/2016 | Hiroma et al. |
| 2017/0011633 A1 | 1/2017 | Boegel |
| 2017/0122841 A1 | 5/2017 | Dudar et al. |
| 2017/0186327 A1 | 6/2017 | Uysal et al. |
| 2017/0197544 A1 | 7/2017 | Wang et al. |
| 2017/0212511 A1 | 7/2017 | Ferreira et al. |
| 2017/0227972 A1* | 8/2017 | Sabau ............... G05D 1/024 |
| 2017/0238321 A1 | 8/2017 | Sartori et al. |
| 2017/0242095 A1 | 8/2017 | Schuh et al. |
| 2017/0242443 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0329348 A1 | 11/2017 | Li et al. |
| 2017/0344023 A1 | 11/2017 | Laubinger et al. |
| 2017/0349176 A1 | 12/2017 | Alden et al. |
| 2017/0361762 A1 | 12/2017 | Wunsche et al. |
| 2018/0006365 A1 | 1/2018 | Powell |
| 2018/0018605 A1 | 1/2018 | Light-Holets et al. |
| 2018/0047293 A1 | 2/2018 | Dudar |
| 2018/0050697 A1 | 2/2018 | Kuszmaul et al. |
| 2018/0074514 A1 | 3/2018 | Switkes et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0111611 A1* | 4/2018 | MacNeille ............ B60W 10/04 |
| 2018/0120861 A1 | 5/2018 | Saxena et al. |
| 2018/0137763 A1 | 5/2018 | Deragården et al. |
| 2018/0143650 A1 | 5/2018 | Klaus et al. |
| 2018/0143651 A1 | 5/2018 | Klaus et al. |
| 2018/0144640 A1 | 5/2018 | Price et al. |
| 2018/0186381 A1 | 7/2018 | Erlien et al. |
| 2018/0188725 A1 | 7/2018 | Cremona et al. |
| 2018/0188744 A1 | 7/2018 | Switkes et al. |
| 2018/0188745 A1 | 7/2018 | Pilkington |
| 2018/0188746 A1 | 7/2018 | Lesher et al. |
| 2018/0190119 A1 | 7/2018 | Miller et al. |
| 2018/0190128 A1 | 7/2018 | Saigusa |
| 2018/0210457 A1 | 7/2018 | Smartt et al. |
| 2018/0210461 A1 | 7/2018 | Cremona et al. |
| 2018/0210462 A1 | 7/2018 | Switkes et al. |
| 2018/0210463 A1 | 7/2018 | Switkes et al. |
| 2018/0210464 A1 | 7/2018 | Switkes et al. |
| 2018/0211544 A1 | 7/2018 | Smartt et al. |
| 2018/0211545 A1 | 7/2018 | Smartt et al. |
| 2018/0211546 A1 | 7/2018 | Smartt et al. |
| 2018/0217610 A1 | 8/2018 | Schuh et al. |

FOREIGN PATENT DOCUMENTS

| | | |
|---|---|---|
| EP | 1975901 B1 | 3/2009 |
| EP | 2390744 A1 | 11/2011 |
| EP | 3316064 A1 | 5/2018 |
| GB | 2540039 A | 1/2017 |
| GB | 2551248 A | 12/2017 |
| GB | 2557001 A | 6/2018 |
| GB | 2557434 A | 6/2018 |
| JP | 05170008 A | 7/1993 |
| JP | 2995970 B2 | 12/1999 |
| JP | 2010030525 A | 2/2010 |
| JP | 5141849 B2 | 2/2013 |
| JP | 2014056483 A | 3/2014 |
| JP | 2017215681 A | 12/2017 |
| WO | 2004077378 A1 | 9/2004 |
| WO | 2009024563 A1 | 2/2009 |
| WO | 2009043643 A1 | 4/2009 |
| WO | 2011125193 A1 | 10/2011 |
| WO | 2013006826 A3 | 3/2013 |
| WO | 2013147682 A1 | 10/2013 |
| WO | 2013165297 A1 | 11/2013 |
| WO | 2013187835 A1 | 12/2013 |
| WO | 2014062118 A1 | 4/2014 |
| WO | 2014092628 A1 | 6/2014 |
| WO | 2014133425 A1 | 9/2014 |
| WO | 2014137270 A1 | 9/2014 |
| WO | 2014137271 A1 | 9/2014 |
| WO | 2014145918 A9 | 12/2014 |
| WO | 2015047174 A1 | 4/2015 |
| WO | 2015047175 A1 | 4/2015 |
| WO | 2015047176 A1 | 4/2015 |
| WO | 2015047177 A1 | 4/2015 |

(56) References Cited

FOREIGN PATENT DOCUMENTS

| | | |
|---|---|---|
| WO | 2015047178 A1 | 4/2015 |
| WO | 2015047179 A1 | 4/2015 |
| WO | 2015047181 A1 | 4/2015 |
| WO | 2015047182 A1 | 4/2015 |
| WO | 2015156731 A1 | 10/2015 |
| WO | 2016065055 A1 | 4/2016 |
| WO | 2016/087901 A1 | 6/2016 |
| WO | 2016134610 A1 | 9/2016 |
| WO | 2016134770 A1 | 9/2016 |
| WO | 2016135207 A1 | 9/2016 |
| WO | 2016/182489 | 11/2016 |
| WO | 2016201435 A1 | 12/2016 |
| WO | 2017035516 A1 | 3/2017 |
| WO | 2017048165 A1 | 3/2017 |
| WO | 2017070714 A9 | 6/2017 |
| WO | 2017/148113 A1 | 9/2017 |
| WO | 2017164792 A1 | 9/2017 |
| WO | 2017/179193 A1 | 10/2017 |
| WO | 2017184062 A1 | 10/2017 |
| WO | 2017184063 A1 | 10/2017 |
| WO | 2017196165 A1 | 11/2017 |
| WO | 2017200433 A1 | 11/2017 |
| WO | 2017204712 A1 | 11/2017 |
| WO | 2017209124 A1 | 12/2017 |
| WO | 2017209666 A1 | 12/2017 |
| WO | 2017210200 A1 | 12/2017 |
| WO | 2018/035145 A1 | 2/2018 |
| WO | 2018/043519 A1 | 3/2018 |
| WO | 2018/043520 A1 | 3/2018 |
| WO | 2018/043753 A1 | 3/2018 |
| WO | 2018/054520 A1 | 3/2018 |
| WO | 2018038964 A1 | 3/2018 |
| WO | 2018039114 A1 | 3/2018 |
| WO | 2018039134 A1 | 3/2018 |
| WO | 2018/000386 A1 | 4/2018 |
| WO | 2018085107 A1 | 5/2018 |
| WO | 2018/106774 A1 | 6/2018 |
| WO | 2018/111177 A1 | 6/2018 |
| WO | 2018/135630 A1 | 7/2018 |
| WO | 2018/137754 A1 | 8/2018 |

OTHER PUBLICATIONS

"Surface Vehicle Recommended Practice, J1939-71, Vehicle Application Layer" (SAE International, Warrendale, PA, Mar. 2011), 1201 pages.
Al Alam, Assad et al. "An Experimental Study on the Fuel Reduction Potential of Heavy Duty Vehicle Platooning", 2010 13th International IEEE Annual Conference on Intelligent Transportation Systems, Sep. 2010, pp. 306-311.
Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.
Alvarez, Luis & Horowitz, Roberto, "Safe Platooning in Automated Highway Systems Part I: Safety Regions Design", Vehicle System Dynamics, vol. 32, Jul. 1999, pp. 23-55.
Alvarez, Luis & Horowitz, Roberto, "Safe Platooning in Automated Highway Systems Part II: Velocity Tracking Controller", Vehicle System Dynamics, vol. 32, Jul. 1999, pp. 57-84.
Aoki, Keiji, "Research and development of fully automated vehicles", International Conference "Global/Local Innovations for Next Generation Automobiles" Part 1, paper OS5-1, Nov. 2013, 3 pages.
Bae, Hong S. et al., "Road Grade and Vehicle Parameter Estimation for Longitudinal Control Using GPS", 2001 IEEE Intellegent Transportaion Systems Conference Proceedings, Aug. 2001, pp. 166-171.
Bergenheim, Carl et al., "Overview of Platooning Systems", 19th ITS World Congress, Vienna, Austria, Oct. 22-26, 2012, 7 pages.
Bergenheim, Carl et al., "Vehicle-to-Vehicle Communication for a Platooning System", Procedia—Social and Behavioral Sciences, vol. 48, Jun. 2012, pp. 1222-1233.

Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages; Retrieved Aug. 23, 2018 at http://atri-online.org/wp-content/uploads/2015/05/DATPPhase1FinalReport.pdf.
Bishop, Richard et al., "White Paper: Automated Driving and Platooning Issues and Opportunities", ATA Technology and Maintenance Council Future Truck Program, Automated Driving and Platooning Task Force Report (Auburn Univ., Auburn, AL, Sep. 2015), 48 pages; Retrieved Nov. 17, 2017 from http://eng.auburn.edu/~dmbevly/FHWA_AU_TRUCK_EAR/FHWA_Auburn_DATP_Phase1FinalReport.
Brizzolara, Davide & Toth, Andrea, "The Emergence of Truck Platooning", Baltic Transport Journal, Mar. 2016, pp. 58-59.
Browand, Fred et al. "Fuel Saving Achieved in the Field Test of Two Tandem Trucks", California PATH Research Report UCB-ITS-PRR-2004-20 (U.C. Berkeley, Berkeley, CA, Jun. 2004), 29 pages.
Desjardins, Charles et al., "Cooperative Adaptive Cruise Control: A Reinforcement Learning Approach", IEEE Transactions on Intelligent Transportation Systems, vol. 12, No. 4, Dec. 2011, pp. 1248-1260.
Erlien, Stephen M. , "Shared Vehicle Control Using Safe Driving Envelopes for Obstacle Avoidance", Ph.D Dissertation, Dept. of Mechanical Engineering (Stanford University, Stanford, CA, Mar. 2015), 182 pages.
Friedrichs, Andreas et al., "A Generic Software Architecture for a Driver Information System to Organize and Operate Truck Platoons", International Conference on Heavy Vehicles, Paris, France, vol. 10, May 2008, pp. 250-259.
Geiger, Andreas et al., "Team AnnieWAY's Entry to the 2011 Grand Cooperative Driving Challenge", IEEE Transactions on Intelligent Transportation Systems, vol. 13, No. 3, Sep. 2012, pp. 1008-1017.
Gerdes, J. Christian & Hedrick, J. Karl, "Brake System Requirements for Platooning on an Automated Highway", Proceedings of the American Control Conference, Seattle, WA, Jun. 1995, pp. 165-169.
Gerdes, J. Christian & Hedrick, J. Karl, "Vehicle Speed and Spacing Control via Coordinated Throttle and Brake Actuation", Control Eng. Practice, vol. 5, No. 11, Sep. 1997, pp. 1607-1614.
Hallé, Simon, "Automated Highway Systems: Platoons of Vehicles Viewed as a Multiagent System", M.Sc. Dissertation, Faculté des Sciences et de Génie (Univ. Laval, Québec, Canada, Jun. 2005), 194 pages.
Hellström, Magnus, "Engine Speed Based Estimation of the indicated Engine Torque", Master's Thesis, Dept. of Electrical Engineering, Reg.# LiTH-ISY-EX-3569-2005 (Linköpings Universitet, Linköping, Sweden, Feb. 2005), 59 pages.
Holm, Erik Jonsson, "Vehicle Mass and Road Grade Estimation Using Kalman Filter", Master's Thesis, Dept. of Electrical Engineering, LiTH-ISY-EX—11/4491—SE (Linköpings Universitet, Linköping, Sweden, Aug. 2011), 50 pages.
Jacobson, Jan et al. "Functional Safety in Systems of Road Vehicles", SP Report Jul. 2010 (SP Technical Research Institute of Sweden, Borås, Sweden, Jul. 2010), 50 pages.
Kidambi, Narayanan et al. "Methods in Vehicle Mass and Road Grade Estimation", SAE Int. J. Passeng. Cars—Mech. Syst., vol. 7. No. 3, Apr. 2014, 2014-01-0111, 11 pages.
Kozan, Recep et al., "An Experimental Approach for Engine Mapping", Modern Applied Science, vol. 3, No. 3, Mar. 2009, pp. 3-9.
Kunze, Ralph et al. "Efficient Organization of Truck Platoons by Means of Data Mining", ICINCO 2010, Proceedings of the 7th International Conference on Informatics in Control, Automation and Robotics, vol. 1, Funchal, Madeira, Portugal, Jan. 2010, pp. 104-113.
Kunze, Ralph et al., "Organization and Operation of Electronically Coupled Truck Platoons on German Motorways", International Conference on Intelligent Robotics and Applications, Conference Proceedings ICIRA 2009, Singapore, Dec. 2009, pp. 135-146.

(56) References Cited

OTHER PUBLICATIONS

Larson, Jeffrey et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 2013, pp. 1196-1202.
Li, Shengbo Eben & Peng, Huei, "Strategies to Minimize Fuel Consumption of Passenger Cars During Car-Following Scenarios", 2011 American Control Conference, San Francisco, CA, Jun. 2011, pp. 2107-2112.
Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzerland, Jul. 2014), pp. 247-261.
Meisen, Philipp et al. "A Data-Mining Technique for the Planning and Organization of Truck Platoons", International Conference on Heavy Vehicles, Paris, France, vol. 10, May 2008, pp. 270-279.
Michaelian, Mark & Browand, Fred, "Field Experiments Demonstrate Fuel Savings for Close-Following", California PATH Research Report UCB-ITS-PRR-2000-14, (U.C. Berkeley, Berkeley, CA, Sep. 2000), 28 pages.
Micheau, Philippe & Oddo, Rémy, "Revolution Speed Limiter for Engine Subjected to Large Load Variation", IFAC Advances in Automotive Control, Salerno, Italy, Apr. 2004, pp. 221-226.
Nowakowski, Christopher et al. "Cooperative Adaptive Cruise Control: Testing Drivers' Choices of Following Distances", California PATH Research Report UCB-ITS-PRR-2011-01 (U.C. Berkeley, Jan. 2011), 171 pages. (Submitted in 2 parts due to file size limitations.).
Nowakowski, Christopher et al., "Cooperative Adaptive Cruise Control (CACC) for Truck Platooning: Operational Concept Alternatives", Research Report under Cooperative Agreement No. DTFH61-13-H-00012 Task 1.2, California PATH Program, (U.C. Berkeley, Berkeley, CA, Mar. 2015), 50 pages; Retrieved Aug. 25, 2017 from http://escholarship.org/uc/item/7jf9n5wm.
Nowakowski, Christopher et al., "Heavy vehicle automation: Human factors lessons learned", Procedia Manufacturing vol. 3, Jul. 2015, pp. 2945-2952.
Packard, Andrew et al., "Section 5, Simple Cruise Control", Class notes, ME 132:Dynamic Systems and Feedback, Dept. of Mechanical Engineering (U.C. Berkeley, Spring 2005), pp. 24-52.
Paulsson, E. & Åsman, L., "Vehicle Mass and Road Grade Estimation using Recursive Least Squares", M.Sc. Thesis, Department of Automatic Control, ISRN LUTFD2/TFRT—6009—SE (Lund University, Lund, Sweden, Jun. 2016), 51 pages.
Porche, Isaac et al., "Real Time Task Manager for Communications and Control in Multicar Platoons", in Proceedings of the Intelligent Vehicles '92 Symposium, Detroit, MI, Jun. 29-Jul. 1, 1992, pp. 409-414.
Ramakers, Richard et al., "Electronically coupled truck platoons on German highways", Proceedings of the 2009 IEEE International Conference on Systems, Man, and Cybernetics, San Antonio, TX, Oct. 2009, pp. 2409-2414.
Roeth, Michael, "CR England Peloton Technology Platooning Test Nov. 2013", (North American Council on Freight Efficiency (NACFE. org), Fort Wayne, IN, Dec. 2013);Retrieved Aug. 23, 2018 at https://nacfe.org/wp-content/uploads/2018/02/Peloton-NACFE-Fuel-Test-Report-120213.pdf.

Sheikholeslam, Shahab & Desoer, Charles A. "Longitudinal Control of a Platoon of Vehicles; III: Nonlinear Model", UCB PATH Report UCB-ITS-PRR-90-1 (U.C. Berkeley, Berkeley, CA, Apr. 1990), 25 pages.
Sheikholeslam, Shahab & Desoer, Charles A., "A System Level Study of the Longitudinal Control of a Platoon of Vehicles", Transactions of the ASME, vol. 114, Jun. 1992, pp. 286-292.
Sheikholeslam, Shahab & Desoer, Charles A., "Longitudinal Control of a Platoon of Vehicles", Proceedings of the American Control Conference, San Diego, CA, May 23-25, 1990, pp. 291-296.
Shladover, Steven E. et al. "Development and Evaluation of Selected Mobility Applications for VII: Concept of Operations", California PATH Working Paper UCB-ITS-PWP-2009-3 (U.C. Berkeley, Berkeley, CA, Mar. 2009), 14 pages.
Shladover, Steven E. et al., "Cooperative Adaptive Cruise Control: Definitions and Operating Concepts", Transportation Research Record: Journal of the Transportation Research Board, vol. 2489, Nov. 2015, pp. 145-152.
Shladover, Steven E. et al., "Demonstration of Automated Heavy-Duty Vehicles", California PATH Research Report UCB-ITS-PRR-2005-23 (U.C. Berkeley, Berkeley, CA, Jun. 2005), 459 pages.
Shladover, Steven E., "Development and Evaluation of Selected Mobility Applications for VII (a.k.a. IntelliDrive)", California PATH PowerPoint Presentation (U.C. Berkeley, Berkeley, CA, Jul. 2009), 17 pages; Retrieved Jul. 21, 2017 from http://slideplayer.com/slide/6981587/.
Sugimachi, Toshiyuki et al. "Development of Autonomous Platooning System for Heavy-duty Trucks", Proceedings of the 7th IFAC Symposium on Advances in Automotive Control, Tokyo, Japan, IFAC Proceedings vol. 46, Issue 21, Sep. 2013, pp. 52-57.
Tsugawa, Sadayuki et al., "A Review of Truck Platooning Projects for Energy Savings", IEEE Transactions on Intelligent Vehicles, vol. 1 No. 1, Mar. 2016, pp. 68-77.
Tsugawa, Sadayuki et al., "An Automated Truck Platoon for Energy Saving", 2011 IEEE/RSJ International Conference on Intelligent Robots and Systems, San Francisco, CA, Sep. 2011, pp. 4109-4114.
Tsugawa, Sadayuki et al., "An Overview on an Automated Truck Platoon within the Energy ITS Project", Proceedings of the 7th IFAC Symposium on Advances in Automotive Control, Tokyo, Japan, IFAC Proceedings vol. 46, Issue 21, Sep. 2013, pp. 41-46.
Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.
Zabat, Michael et al., "The Aerodynamic Performance of Platoons: Final Report", California PATH Research Report UCB-ITS-PRR-95-35 (U.C. Berkeley, Berkeley, CA, Oct. 1995), 172 pages.
Zhao, Siyang et al., "Vehicle to Vehicle Communication and Platooning for EV with Wireless Sensor Network", SICE Annual Conference 2015, Hangzhou, China, Jul. 2015, pp. 1435-1440.
Jacobson, Jan et al. "Functional Safety in Systems of Road Vehicles", SP Report 2010:07 (SP Technical Research Institute of Sweden, Borås, Sweden, Jul. 2010), 50 pages.
Shladover, Steven E., "Development and Evaluation of Selected Mobility Applications for VII (a.k.a. IntelliDrive)", California PATH PowerPoint Presentation (U.C. Berkeley, Berkeley, CA, Jul. 2009), 17 pages; Retrieved Jul. 21, 2017 from http://slideplayer.com/slide/6981587/.

\* cited by examiner

DEVICES, SYSTEMS, AND METHODS FOR TRANSMITTING VEHICLE DATA

CROSS-REFERENCE TO RELATED APPLICATIONS

This application is a continuation in part of U.S. application Ser. No. 15/607,316, filed May 26, 2017, which is a continuation of U.S. application Ser. No. 14/292,583. Filed May 30, 2014, now U.S. Pat. No. 9,665,102, which is a division of U.S. application Ser. No. 13/542,622, filed Jul. 5, 2012, now U.S. Pat. No. 8,744,666, all of which are entitled "Systems and Methods for Semi-Autonomous Vehicular Convoys". Additionally. U.S. application Ser. No. 13/542,622 claims the benefit of U.S. Provisional Application No. 61/505,076, filed on Jul. 6, 2011, which is entitled "Systems and Methods for Semi-Autonomous Vehicular Convoying".

Additionally. U.S. application Ser. No. 14/292,583 is a division of U.S. application Ser. No. 13/542,627, filed Jul. 5, 2012, now U.S. Pat. No. 9,582,006, entitled "Systems and Methods for Semi-Autonomous Convoying of Vehicles", which in turn also claims the benefit of U.S. Provisional Application No. 61/505,076, filed on Jul. 6, 2011.

BACKGROUND

Controlling vehicles using vehicle-to-vehicle communication has been a challenging task for many decades now. While many enterprises have tried to create vehicles that can be controlled remotely, many have failed due to the complexity of the systems at play. While a toy car may not be difficult to assemble, building a large vehicle for use on public roads can be a daunting task. For example, vehicles may need to utilize some type of computer vision, such as camera, radar, or LIDAR, to prevent accidental collisions. In some systems, various vehicle dynamics come into play and a precise system must know the weight of a vehicle, a vehicle's wheelbase, a vehicle's suspension, etc.

Previous solutions to control vehicles have included drive-by-wire systems. A drive-by-wire system replaces a mechanical system in a car by electronically "connecting" major components. For example, an accelerator pedal that would normally have cables attached to it to control the throttle valve of an engine can be replaced with a pedal that is electronically connected to the throttle valve of an engine. Similarly, a brake by wire system could eliminate the need for hydraulics by using motors to actuate calipers, in comparison to the currently existing technology where a system provides braking effort by building hydraulic pressure in brake lines. With steering by wire, fewer mechanical components or linkages between the steering wheel and the wheels are utilized and replaced by electric motors which may be actuated by electronic control units (ECUs) monitoring steering wheel inputs.

While drive-by-wire systems work well in some environments, they are not always ideal for precision systems as required by vehicles that travel on public roads. For example, controlling a vehicle's speed using only an engine throttle and a caliper brake may not be ideal when precision acceleration or braking is required. Similarly, controlling the direction of a vehicle's wheels by moving a steering wheel (physically or remotely) may not be as precise as required by some applications—particularly at high speeds.

Thus, devices, methods, and systems described herein provide improvements in the art by being capable of controlling one or more vehicles, including a platoon of vehicles, more precisely than systems currently available in the art.

SUMMARY

The system and methods comprising various aspects of the disclosure described herein combine attributes of state of the art convenience, safety systems, and manual control to provide a safe, efficient convoying or platooning solution. For example, but without limitation, aspects of the present invention enable a method for maintaining a relationship between more than one vehicle. In such a method, a lead vehicle may provide data from its electronic control units (ECUs) (e.g., an engine ECU, a brake ECU, a retarder ECU, a transmission ECU) to a rear vehicle's platooning ECU. A platooning ECU may then augment the information it received from the lead vehicle based on: (1) differences between a target distance between the two vehicles and a current distance between the two vehicles, and (2) a time offset based at least on the distance between the two vehicles and the speed of the rear vehicle. The rear vehicle's platooning ECU may then provide the augmented data to other ECUs within the rear vehicle (e.g., an engine ECU, a brake ECU, a retarder ECU, a transmission ECU). After the data is provided to the rear vehicle's ECUs, the rear vehicle's ECUs may perform operations such as requesting additional torque from an engine or other powertrain system, or shifting gears at a transmission.

As another example, aspects of the present invention enable a method for communicating information associated with torque between two or more vehicles. Based on the torque data, a gap between two vehicles may be determined, maintained, or otherwise modified. The torque data may be provided by an ECU associated with an engine. Additionally, torque data can assist with controlling a speed, accelerating, and braking.

Systems described herein, without limitation, may include a platooning ECU capable of determining whether two vehicles may platoon, whether two vehicles are platooning, and/or whether two vehicles should stop platooning. Such information may be based on information provided by a lead vehicle, which may be produced by the lead vehicle's ECUs. The lead vehicle's ECU data may be sent wirelessly to one or more rear vehicles and include information related to torque, brake, a retarder, etc. The platooning ECU may receive the lead vehicle's ECU data and modify it based on information associated with a current gap between one or more vehicles, a target/desired gap between one or more vehicles, and a time offset associated with the speeds and positions of one or more vehicles. Next, the modified information may be sent by the platooning ECU to one or more ECUs in the rear vehicle. Based on the modified information received by the rear vehicle's ECUs, the rear vehicle's ECUs may perform the same, or substantially/effectively the same operations as some or all of the lead vehicle's ECUs.

It will be appreciated by those skilled in the art that the various features of the present disclosure can be practiced alone or in combination. These and other features of the present disclosure will be described in more detail below in the detailed description of the disclosure and in conjunction with the following figures.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
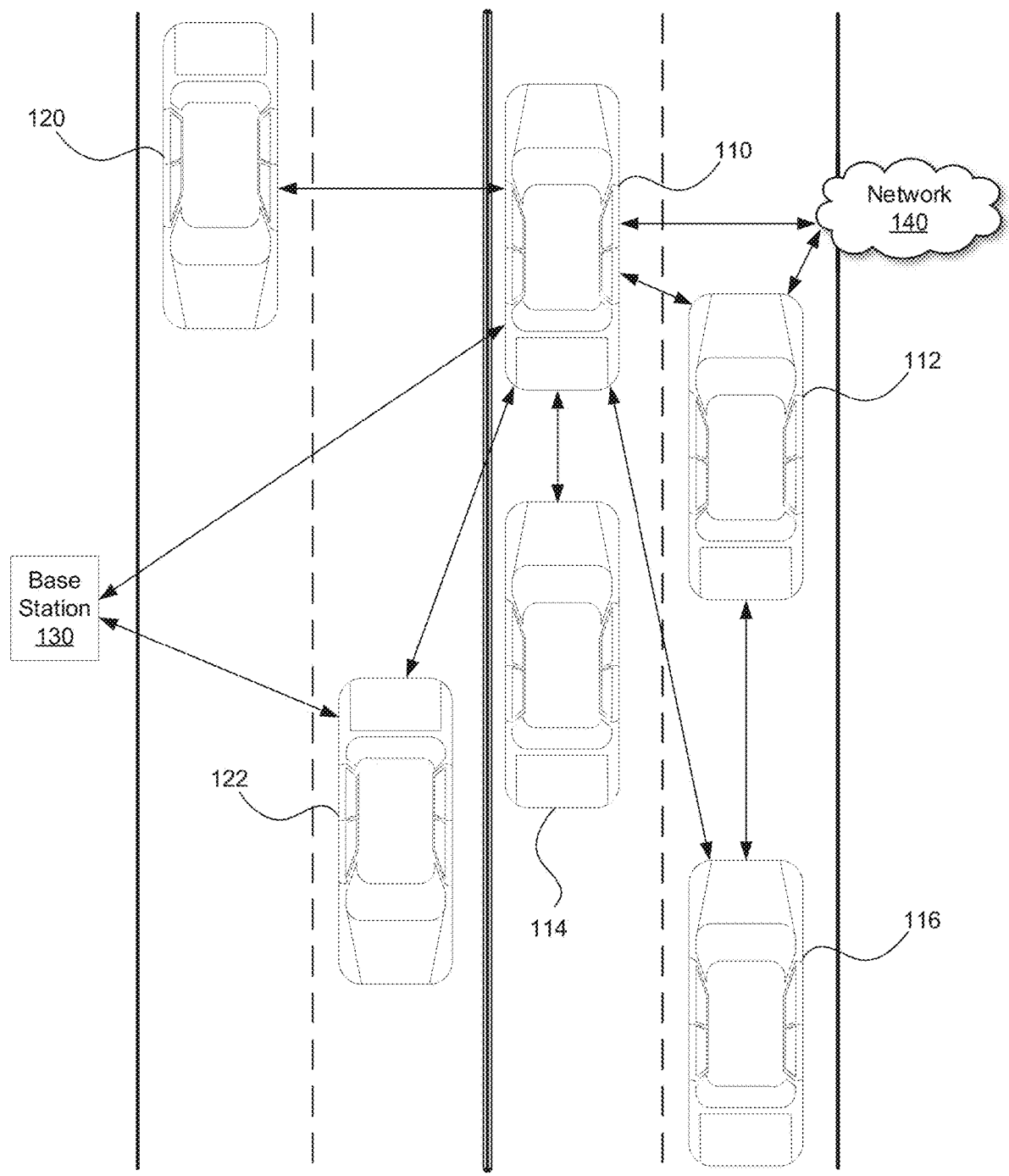
FIG. 1 illustrates a diagram of vehicles transmitting data, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein.

The Applicant has proposed various vehicle communication systems in which a second, and potentially additional, vehicle(s) is/are automatically, or semi-automatically controlled in response to receiving instructions from a first vehicle. By way of example, U.S. patent application Ser. Nos. 15/605,456, 15/607,902; 13/542,622 and 13/542,627; U.S. Provisional Patent Application Nos. 62/377,970 and 62/343,819, and PCT Application Nos. PCT/US2014/030770, PCT/US2016/049143 and PCT/US2016/060167 describe various vehicle systems in which a recipient vehicle is at least partially controlled by a provider vehicle (e.g., a recipient vehicle is a vehicle that receives data from a provider vehicle, but it should be understood that a recipient vehicle can send data to a provider vehicle). Some of these applications describe platooning, wherein at least one vehicle follows closely behind another. In such cases, a recipient vehicle may be referred to as a trailing vehicle and/or a rear vehicle, and a provider vehicle may be referred to as a lead vehicle and/or a front vehicle. Each of these earlier applications is incorporated herein by reference.

For the purposes of this application, the subtle yet important difference between controlling and commanding should be understood. Herein, the term commanding may be used to signify an action where a device is ordered to do something, while controlling refers to device supervision and/or adjustment. For example, an engine may be commanded to provide 2,000 N·m as opposed to controlling, where an engine ensures 2,000 N·m is being provided while potentially taking other variables into account and adjusting as needed such that the engine is substantially (e.g., for the most part/about/close to) providing a particular amount of torque, which in this case would be substantially 2,000 N·m. Herein, if a system can command and/or control, the term command/control may be used.

In some embodiments described herein, a vehicle may essentially command/control some or all of the functions of another vehicle using V2V communications. Research in the field of V2V communications has increased in recent years. In some embodiments herein, a recipient vehicle controlled by a provider vehicle will receive data from the provider vehicle including drive-by-wire commands. For example, a provider vehicle may send data wirelessly to a recipient vehicle, wherein the sent data causes the recipient vehicle to apply a certain amount of throttle. As another example, a provider vehicle may send data to more than one vehicle (e.g., broadcast data), and such data may command/control vehicles. For example, one vehicle may provide data to more than one other vehicle causing the receiving vehicles to apply their brakes.

As discussed above, in some instances providing instructions to command/control a throttle pedal, brake pedal, or steering wheel may not provide a desired amount of precision. For example, in some cases controlling the location of a throttle pedal may be less precise than commanding/controlling an engine ECU such that the engine produces a certain amount of torque. Similarly, in some systems commanding/controlling an engine ECU, brake ECU, and/or retarder ECU may cause an amount of torque (e.g., engine gross torque, engine net torque, wheel torque) to be provided that is more precise than a system that merely controls the location of an accelerator pedal and a brake pedal. For example, a system controlling a truck traveling downhill may benefit by being able to control torque using an engine ECU, break ECU, and/or retarder ECU.

Herein, the term torque is used broadly to mean any portion of a system that may affect the torque of a vehicle, unless explicitly stated otherwise. For instance, the term torque may be used to describe, at least: (1) engine gross torque, (2) engine net torque, (3) wheel torque from an engine, and (4) wheel torque from braking. Further, each of these may include gear/transmission/shifting information, and various types of torque may be combined (e.g., wheel torque from an engine and wheel torque from braking may be combined and referred to as wheel torque).

At a high level, torque is a rotational force. An engine's gross torque, as an example, is the twisting force that an engine can produce before parasitic losses from the drivetrain (although, in some embodiments, an engine's gross torque may be an amount of force applied by pistons to a drive shaft). An engine's net torque, for example, may be the definition used by SAE standards J1349 and J2723, and may be the torque from an engine, measured at the same location as the gross torque (e.g., after the flywheel), when the engine is equipped with some or all of the parts necessary for actual engine operation (e.g., when an engine is actually installed in a vehicle). An engine's torque is transmitted through a gearbox, where it is multiplied with a gear ratio of an engaged gear, and produces a gearbox torque. It should be understood that commanding/controlling torque, as described herein, can apply to electric vehicles, including electric vehicles that may employ multispeed gearing (e.g., a transmission capable of shifting gear ratios). Next, torque can be measured at a differential, which then sends torque in multiple directions to the wheels. In some embodiments various amounts of torque are actively directed to one or more wheels (e.g., commanding/controlling torque using a differential such as a limited-slip differential). The amount of torque directed to any particular wheel/set of wheels may be determined based on attributes of a vehicle such as weight, the balance of a load, brake attributes, etc. Rotational force on a wheel may be referred to as wheel torque (e.g., when torque from an engine, retarder, or foundation brake reaches a vehicle's wheel). Wheel torque from an engine typically forces a vehicle to move forward (or backward if in reverse), or accelerate or decelerate if already in motion. However, wheel torque from a brake (e.g., a foundation brake) dampens wheel torque from an engine, and thus provides torque in an opposite direction from the engine torque. Since torque is a sum of all the individual torques acting on an object, wheel torque may be a combination of engine torque, brake torque, and/or any other torques applied.

Thus, herein, the term torque can be used to describe, at least: (1) the gross torque of an engine (e.g., the torque an engine can produce before loss from the drivetrain), (2) the net torque of an engine (e.g., the torque of an engine as it would be when installed in a vehicle including stock ignition timing, fuel delivery, exhaust systems, and accessories), (3) wheel torque (e.g., from an engine, from braking, a combination of the two), and (4) any of the torques described above with or without gear/shifting information (e.g., torque multiplied by a gear ratio or an amount of change of torque when a gear ratio changes).

In some embodiments, commanding/controlling torque may assist with platooning. When platooning, one goal is to maintain a desired position between vehicles. This position may be based on time and/or distance (e.g., time headway, distance headway). Thus, it should be appreciated herein that maintaining a position or gap may refer to a time and/or distance. Unless stated otherwise, references to a position or gap may refer to either a distance between two vehicles and/or an amount of time. In addition, while the term maintain is used throughout this disclosure, maintaining may mean staying within a position/gap, staying at a position/gap, and/or staying outside of a position/gap from another vehicle. Further, in some cases a desired position may be a relative distance and/or angle. Herein, a "target gap" may be a desired gap between a trailing vehicle (e.g., a rear vehicle) and a vehicle in front of the rear vehicle (e.g., a lead vehicle). The vehicles involved in a platoon will typically have sophisticated control systems suitable for initiating a platoon, maintaining the gap under a wide variety of different driving conditions, and gracefully dissolving the platoon as appropriate. Dissolving a platoon may comprise ending a platoon, and/or causing a gap between vehicles to increase such that they are traveling at a safe distance.

In some embodiments, a gap is maintained by using vehicle-to-vehicle (V2V) communications to transmit information from a lead vehicle to a rear vehicle. This information may include radar information indicating the current gap between two vehicles, along with information indicating the speed of the lead vehicle. With this information, along with a target gap, a rear vehicle can apply throttle or brakes such that the current gap is equal to the target gap.

Similarly, in some embodiments a rear vehicle may receive steering and speed information from a lead vehicle. Steering information may include a current direction, a target direction, and/or a speed at which steering is changing (e.g., 0.5 degrees/second). With this information, along with current gap and speed information, a rear vehicle can steer such that it begins changing direction in the same direction and at the same location that the lead vehicle changed direction.

Better yet, in some more advanced embodiments, instead of controlling a throttle and brake to maintain a gap, a rear vehicle may provide information to its electronic control units (ECUs) to ensure that the current gap is equal to the target gap. For example, a platoon electronic control unit (platoon ECU, PECU, or platoon system) may provide input to one or more of a brake ECU, an engine ECU, a retarder ECU, a transmission ECU, and a chassis ECU to control a gap better than by controlling a throttle and brake. In some embodiments, a chassis ECU may control and/or monitor other ECUs such as an engine ECU, a brake ECU, etc.

Here, and as described in various embodiments herein, even more control can be gained by obtaining additional information from the lead vehicle's ECUs to provide more precise instructions to the rear vehicle's ECUs.

In current systems, only a limited amount of information is distributed over Controller Area Network (CAN) busses for ECU communication. In most commercial vehicles, the SAE J1939 protocol is used to transmit information using the CAN bus as the physical layer. Information that is not required to operate a vehicle is generally not sent out onto a CAN bus because vehicles are constantly transmitting other information between ECUs as required to operate the vehicle. CAN busses are often inundated with data/traffic associated with oxygen levels, emission controls, temperatures, throttle position sensors, camshaft position sensors, etc. Thus, in some embodiments described herein, in response to one method of transmitting information (e.g., from a bus to another vehicle and/or from one ECU to another ECU within the same vehicle) becoming congested and/or slowing down, data/traffic may be moved to another bus and/or data/traffic may be arbitrated (e.g., given priority over other data/traffic) to determine when, where, and/or which various data/traffic should be sent. Such an arbitrator may base its determinations on attributes of one or more provider or recipient vehicles, such as its engine or brakes. In addition, in some embodiments, it is contemplated that other protocols may be implemented such as CAN FD (flexible data-rate), which may overcome some traditional limitations of the CAN protocol.

Regardless of what protocol to transfer information is implemented, as described above, a rear vehicle following a lead vehicle may control a gap—and generally perform better—when it is able to obtain as much relevant data as possible from ECUs in the lead vehicle. For example, if the rear vehicle were able to receive more information from ECUs in a lead vehicle than the ECUs in a lead vehicle typically transmit over a CAN bus, a rear vehicle's platooning system could cause the ECUs in the rear vehicle to mimic the ECUs in the lead vehicle and thus platoon with greater accuracy.

For example, an average vehicle's CAN bus is very crowded when sending data between an engine ECU and other components. However, if a platooning system were able to gather additional data from a lead vehicle's engine ECU, brake ECU, and retarder ECU, and send that data to a rear vehicle's engine ECU, brake ECU, and retarder ECU, then the rear vehicle could react quicker and more precisely than current platooning systems as described above. In addition, such a technique could save fuel since the platoon ECU would be controlling throttle management using a feed forward model (e.g., this type of system would be predictive). In other words, techniques described herein may assist in preventing a vehicle from over-shooting a target gap, and then needing to readjust to achieve the target gap.

Of course, to operate correctly, the ECUs on the lead vehicle and the rear vehicle cannot perform the same operations at the same time. For example, if a lead vehicle's engine ECU commands more torque in response to grade increase (e.g., an incline), the rear vehicle's engine ECU would need to wait until it reaches that grade increase before it commands the additional torque. Thus, a platoon ECU may require a time offset which causes operations in the rear vehicle to occur at a different time than those operations in the lead vehicle.

Accordingly, in an ideal system, a platoon ECU can (1) receive information (which may not otherwise typically be available) from a lead vehicle's ECUs, (2) apply a time offset to prevent the rear vehicle from performing the same operations as the lead vehicle too soon, (3) determine a difference between a target gap and a current gap, and (4) send output to the rear vehicle's ECUs such that they mimic the lead vehicle's ECUs while accounting for maintaining a gap and applying a correct time offset.

Of course, the world is not ideal, so a platoon ECU may need to account for other variables. For example, if a rear vehicle is heavier or lighter than a lead vehicle, then the platoon ECU will need to account for the difference in weight. In such a case, for example, the platoon ECU may only command the rear engine ECU to ramp up from 25% of its maximum torque to 30% of its maximum torque, even though the lead truck's engine ECU ramped up from 30% of its maximum torque to 40% of its maximum torque.

FIG. 1 illustrates a diagram of vehicles transmitting data, in accordance with some embodiments. FIG. 1, depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

Figure 2:
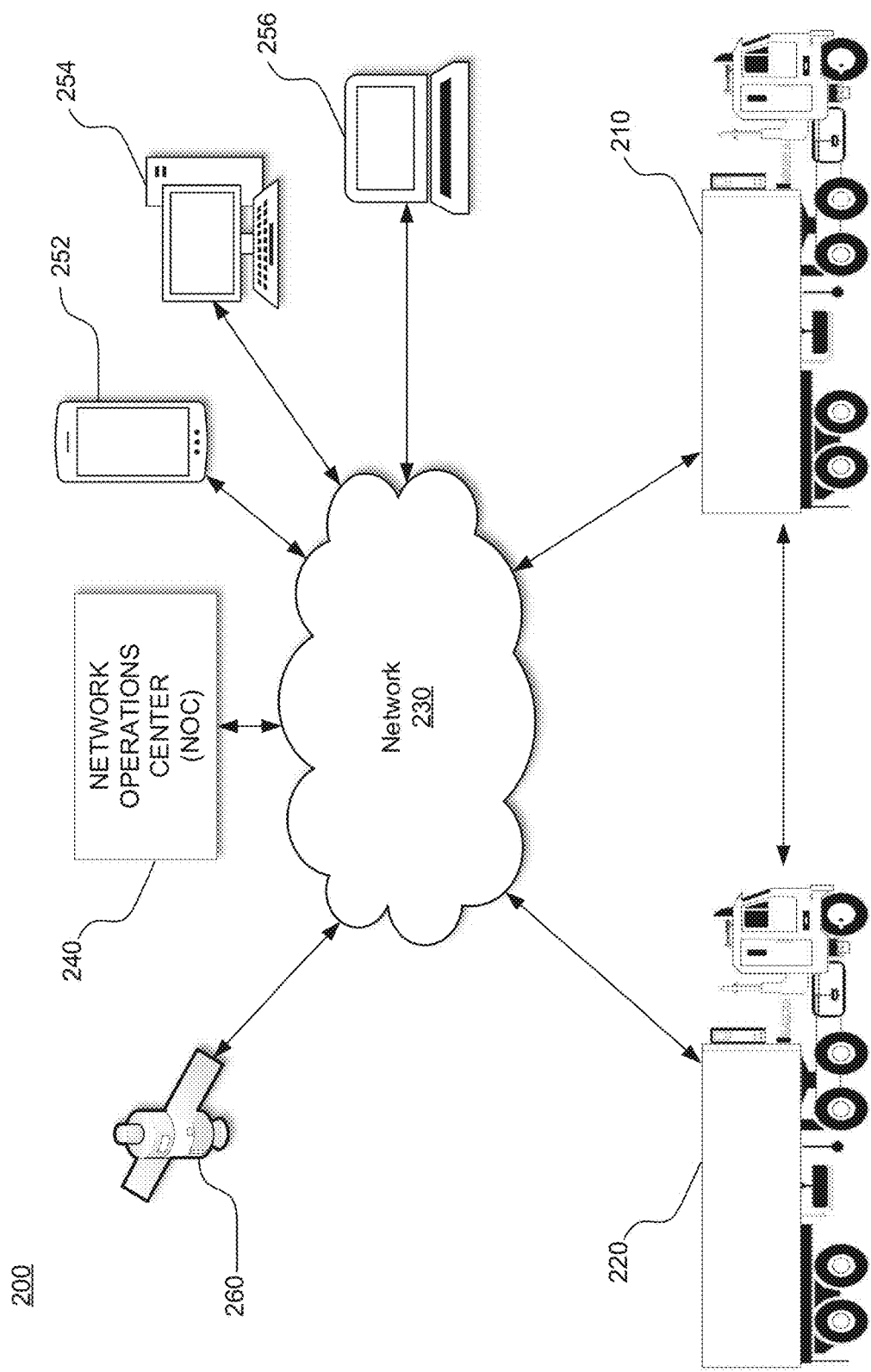
FIG. 2 illustrates a diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
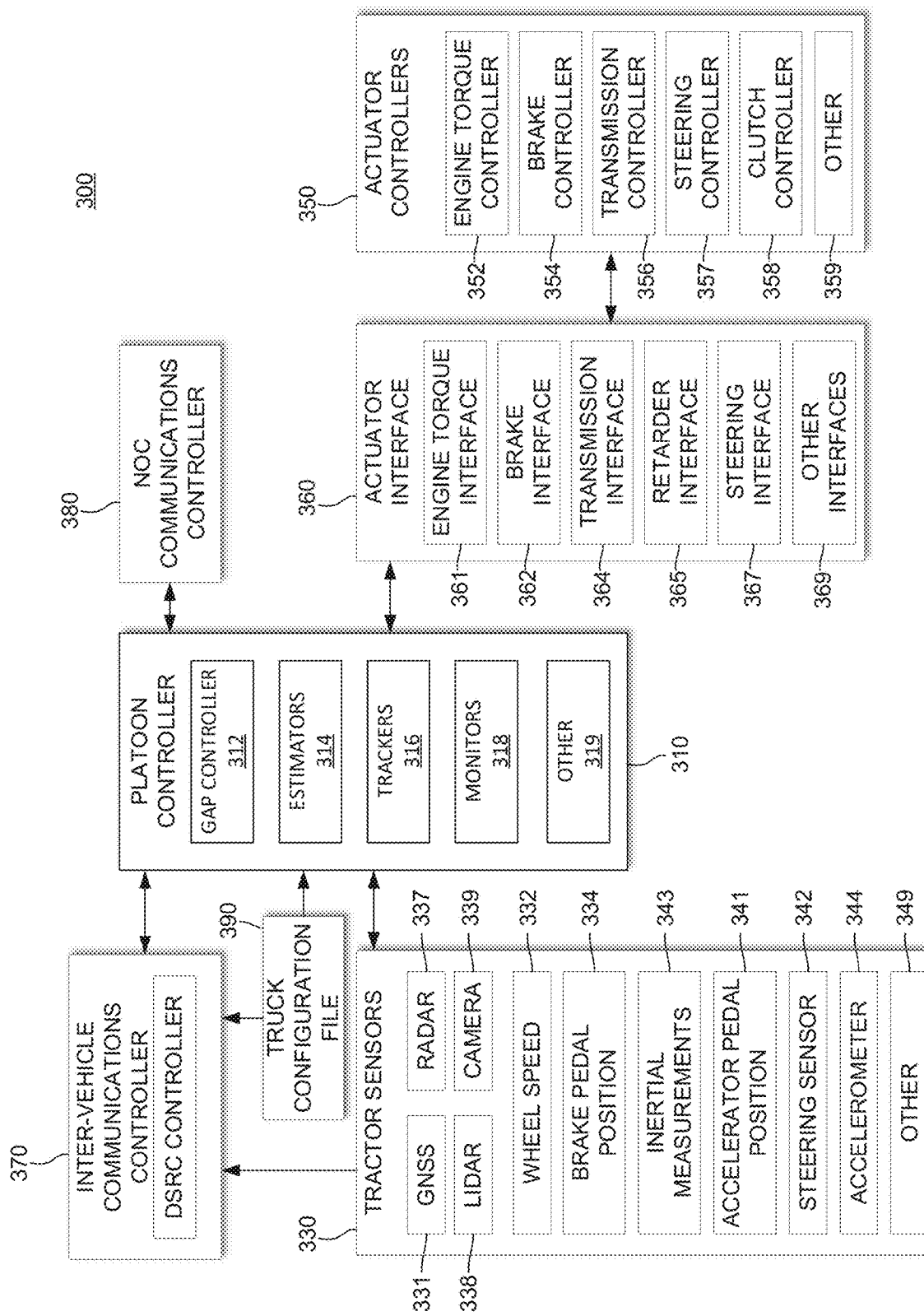
FIG. 3 illustrates a block diagram of a platooning system, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). ECUs will be described in further detail with regard to FIGS. 4 and 5. It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder-obviating the need for a retarder ECU).

Large trucks and other heavy vehicles frequently have multiple systems for "braking" the truck. These include the traditional brake system assemblies mounted in the wheels of the vehicle-which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

Figure 4:
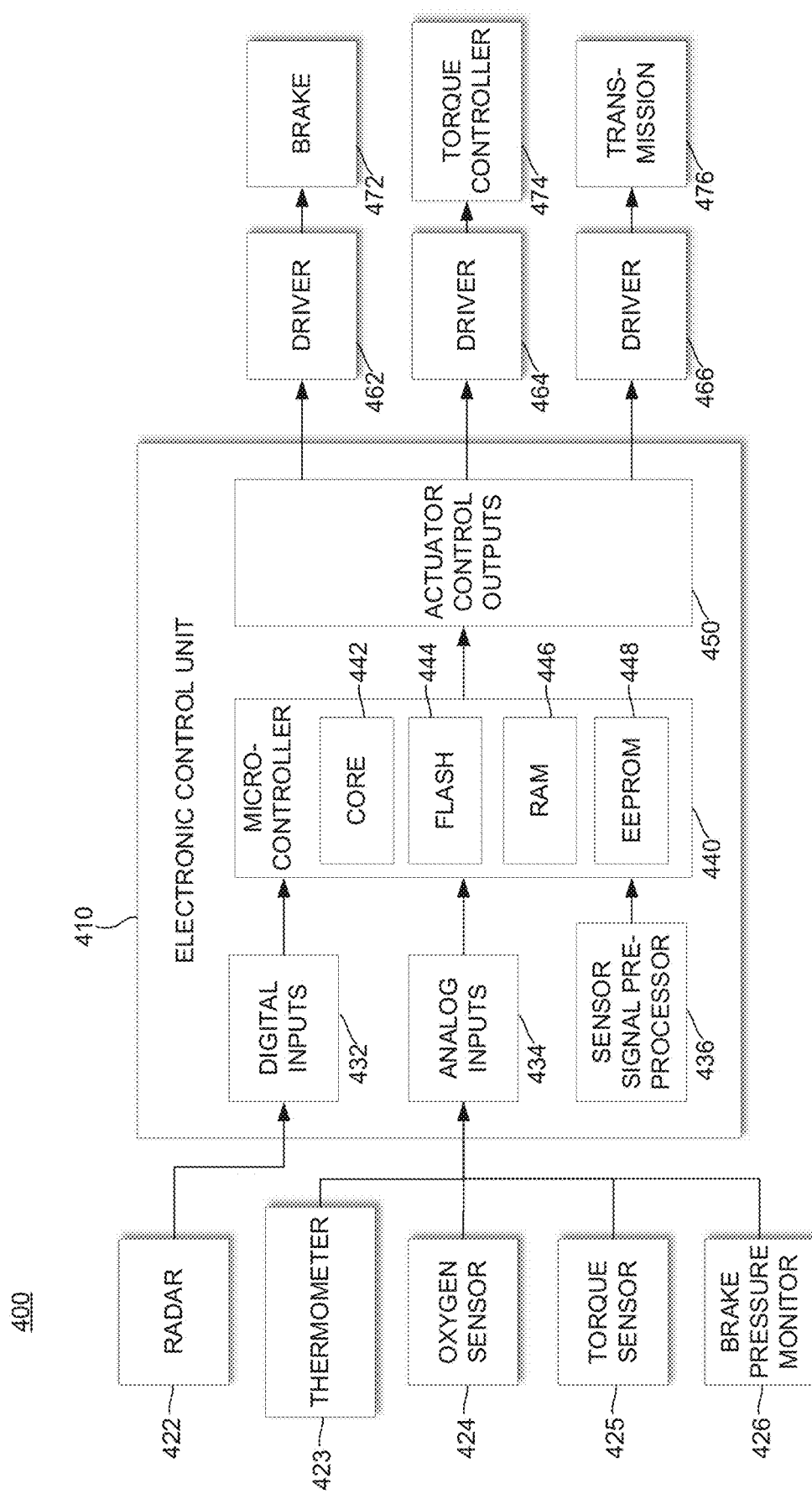
FIG. 4 illustrates a block diagram of a system including an electronic control unit, in accordance with some embodiments.

Continuing on to FIG. 4, a system 400 comprising an example ECU 410 is illustrated. An ECU may be any embedded system in a vehicle that controls one or more of the electrical/electromechanical systems or subsystems associated with a vehicle. For instance, an ECU can control aspects of an engine, transmission, braking system, etc.

ECU 410 may be use a closed-loop control, wherein ECU 410 monitors the output of a system to control the inputs to a system (e.g., managing the emissions and fuel economy of an engine). ECU 410 may gather data from dozens of different sensors including coolant temperature and an amount of oxygen in the exhaust. With such data, ECU 410 can perform millions of calculations per second, including looking up values in tables, and calculating the results of equations to determine the optimal spark timing and determining how long a fuel injector should remain open. Thus, ECU 410 can cause an engine to produce low emissions while saving fuel.

Some of the key elements of an ECU are shown in system 400. ECU 410 may have one or more modules to receive digital inputs 432 and/or analog inputs 434. In some embodiments ECU 410 may include a sensor signal preprocessor 436 to prepare signals for processing. In system 400, example devices are shown which provide input such as radar 432, thermometer 423, oxygen sensor 424, torque sensor 425, and brake pressure monitor 426. It should be well understood that these inputs are merely examples, as some ECUs may be specific to engine monitoring and/or controlling/commanding, brake monitoring and/or controlling/commanding, battery monitoring and/or controlling/commanding, etc.

Further, various components of a vehicle may share an ECU, or may utilize more than one ECU. For example, an engine ECU may control an engine and a retarder. As another example, a transmission may have two ECUs (e.g., one for monitoring a status of the transmission and a second for causing the transmission to shift gears).

Example ECU 410 comprises a microcontroller 440. ECU 410 may include more than one microcontroller. In some embodiments, microcontroller 440 may include on-board flash memory 444, random access memory (RAM) 446, electrically erasable programmable read-only memory (EEPROM) 448, and one or more cores 442. Of course, there are a wide variety of ECUs, and various components (e.g., various types of memory) may not be located on-board microcontroller 440.

In some embodiments, ECU 410 may include actuator control outputs 450, which may send signals to various drivers 462, 464, and 466. Drivers 462, 464, and 466 may in turn cause brake 472, torque controller 474, and/or transmission 476 to operate. Of course, it should be understood that various ECUs may simply monitor components and send information gathered from the components via a wired or wireless signal. A wireless signal generator may be included within, or external to an ECU. Thus, ECUs can monitor devices, send signals to operate devices, or do both.

Figure 5:
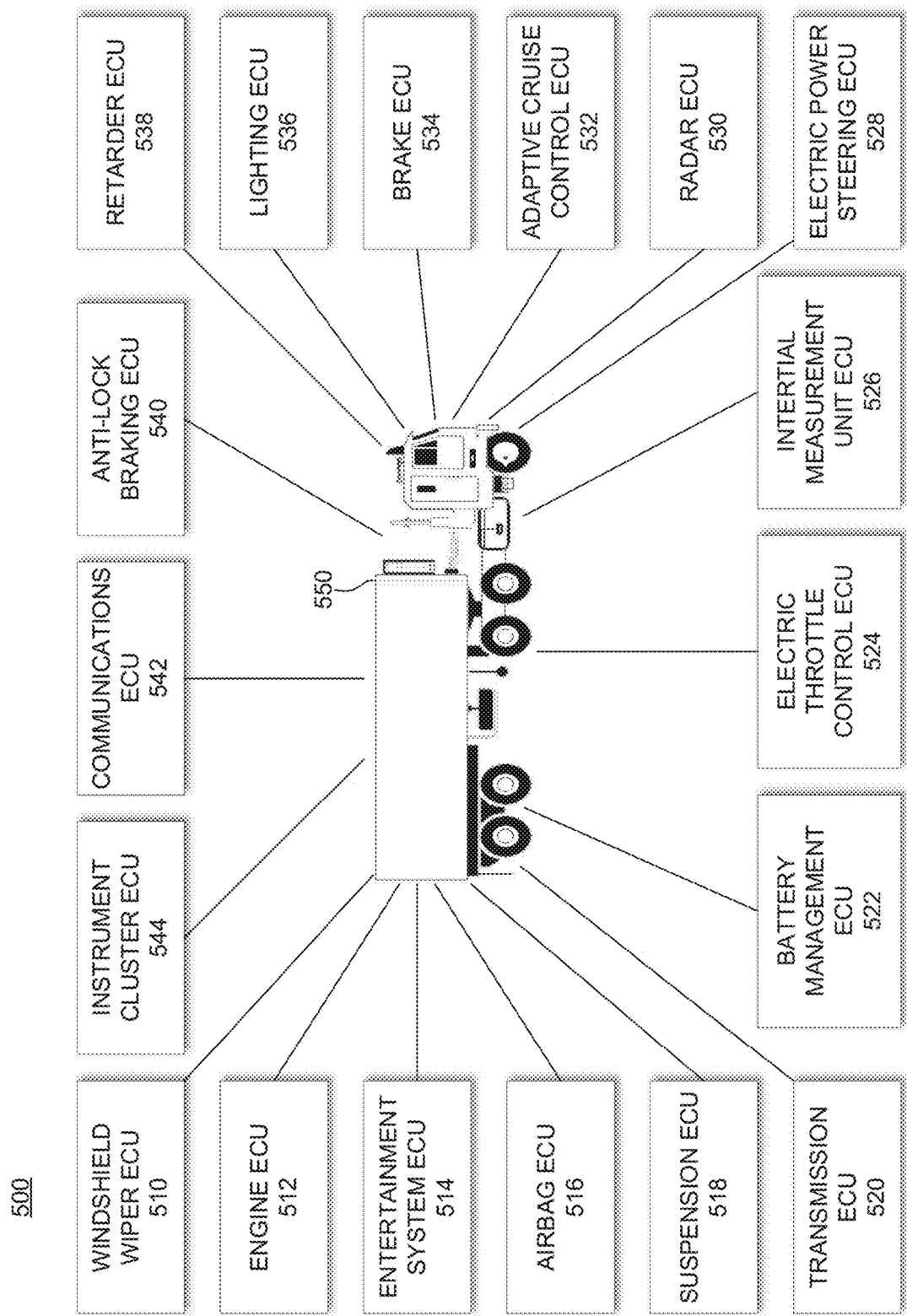
FIG. 5 illustrates a block diagram of a vehicle and its electronic control units, in accordance with some embodiments.

FIG. 5 illustrates a system 500 including example vehicle 550 and various ECUs included in vehicle 550. This illustration is intended to provide the reader with an idea of how many and what types of ECUs may be included in a modern vehicle. Many, if not all of these ECUs, may be controlled in part or fully be another vehicle, a NOC, or other devices.

Today, the number of ECUs in a vehicle may be anywhere from a few dozen to more than a few hundred. Examples shown in FIG. 5 include a windshield wiper ECU 510, which may include functionality to detect rain and/or operate windshield wipers. An engine ECU 512 (traditionally referred to as an Engine Control Unit) may control/command various aspects of an engine. It should be understood that "Engine Control Units" are occasionally referred to as ECUs, and for the purposes of this disclosure Engine Control Units will be referred to as Engine ECUs, or EECUs. System 500 also includes entertainment system ECU 514 which may control speaker(s), user interface(s), and/or display(s). An airbag ECU 516 may be included in some vehicles 550 for added safety in response to a collision. In some embodiments, suspension ECU 518 may be used to control the height of vehicle 550 and/or calculate an estimated weight of vehicle 550.

FIG. 5 also illustrates a transmission ECU 520. In various embodiments, transmission ECU 520 may take input from engine sensors, automatic transmission sensors, and from other ECUs to determine when and how to shift. Inputs to transmission ECU 520 may include, but are not limited to: a vehicle speed sensor, a wheel speed sensor, a throttle position sensor, a turbine speed sensor, a kick down switch, a brake light switch, a traction control system, hydraulic switches, and a cruise control module. Transmission ECU 520 may output signals to control shift solenoids, lock a selector via a shiftlock solenoid, control hydraulic or pneumatic pressure using pressure to control solenoids (to prevent too high a pressure which results in rough shifting, or too low a pressure which may cause a clutch to overheat), a torque converter solenoid (to regulate the torque converter electronically—once fully locked a torque converter no longer applies torque multiplication and will spin at the same speed as the engine, providing an increase in fuel economy), and other ECUs.

Other ECUs included in system 500 include a battery management ECU 522. Battery management ECU 522 may be used to control an amount of power going to an inverter, a motor, or other electrical devices based upon whether a vehicle is platooning. Another type of ECU is an electric throttle control ECU 524, which may electronically connect an accelerator to a throttle, replacing a mechanical linkage. An inertial measurement unit ECU 526 (also referred to as an IMU) may provide information such as a vehicle's current movement status to all requesting devices. This may include a linear and angular motion and/or position derived from gyroscopes and/or accelerometers.

FIG. 5 also includes an electronic power steering ECU 528 to make steering more comfortable. Also, vehicle 550 may include a radar ECU 530, which may be part of an Advanced Driver-Assistance System (ADAS) ECU and/or in compliance with ISO 26262. Another ECU included in example vehicle 550 includes an adaptive cruise control ECU, which may use a speed of vehicle 550, a time headway (e.g., an amount of time/distance assigned by a user), and a gap between a lead vehicle and vehicle 550 as inputs.

FIG. 5 also includes a brake ECU, which may monitor hydraulic pressure, brake pedal location, brake wear, and other attributes of brakes. In some embodiments, an anti-lock break ECU 540 may be included in addition to, or as part of brake ECU 534. Anti-lock braking ECU 540 may receive inputs such as wheel speed sensors, radar, lidar, other gap measurement instrument, and other brake attributes, and include outputs such as actuators that control brakes, modulator valves, etc.

Also included in FIG. 5 is a lighting ECU 536 which may control interior and/or exterior lighting. In some embodiments lighting ECU 536 may control lights that indicate vehicle 450 is platooning. A retarder ECU 538 is also included in FIG. 5. Retarder ECU 538 may work in conjunction with brake ECU 534, engine ECU 512, transmission ECU 520, an IMU (e.g., Internal Measurement Unit ECU 526), and/or other ECUs to monitor vehicle conditions such as speed and relative angle, and, in some embodiments, to control a hydraulic or electric retarder.

Additionally, vehicle 550 may also include a communications ECU 542 which may receive and/or transmit various wired or wireless signals such as GPS information, DSRC packets, CB radio transmissions, etc. Further, vehicle 550 may include an instrument cluster ECU 544 which may receive inputs such as buttons that are pressed on an interface. Such a button may cause operations associated with platooning to occur, such as, but not limited to: initiating a platoon, dissolving a platoon, a brightness of a monitor associated with a platooning system, a volume of a speaker system associated with a platooning system, etc.

It is contemplated that in some embodiments a chassis ECU may be included in vehicle 550. A chassis ECU may monitor and control some or all sensors, actuators, and/or other devices in a vehicle, requiring fewer ECUs to perform a same amount of operations.

Figure 6:
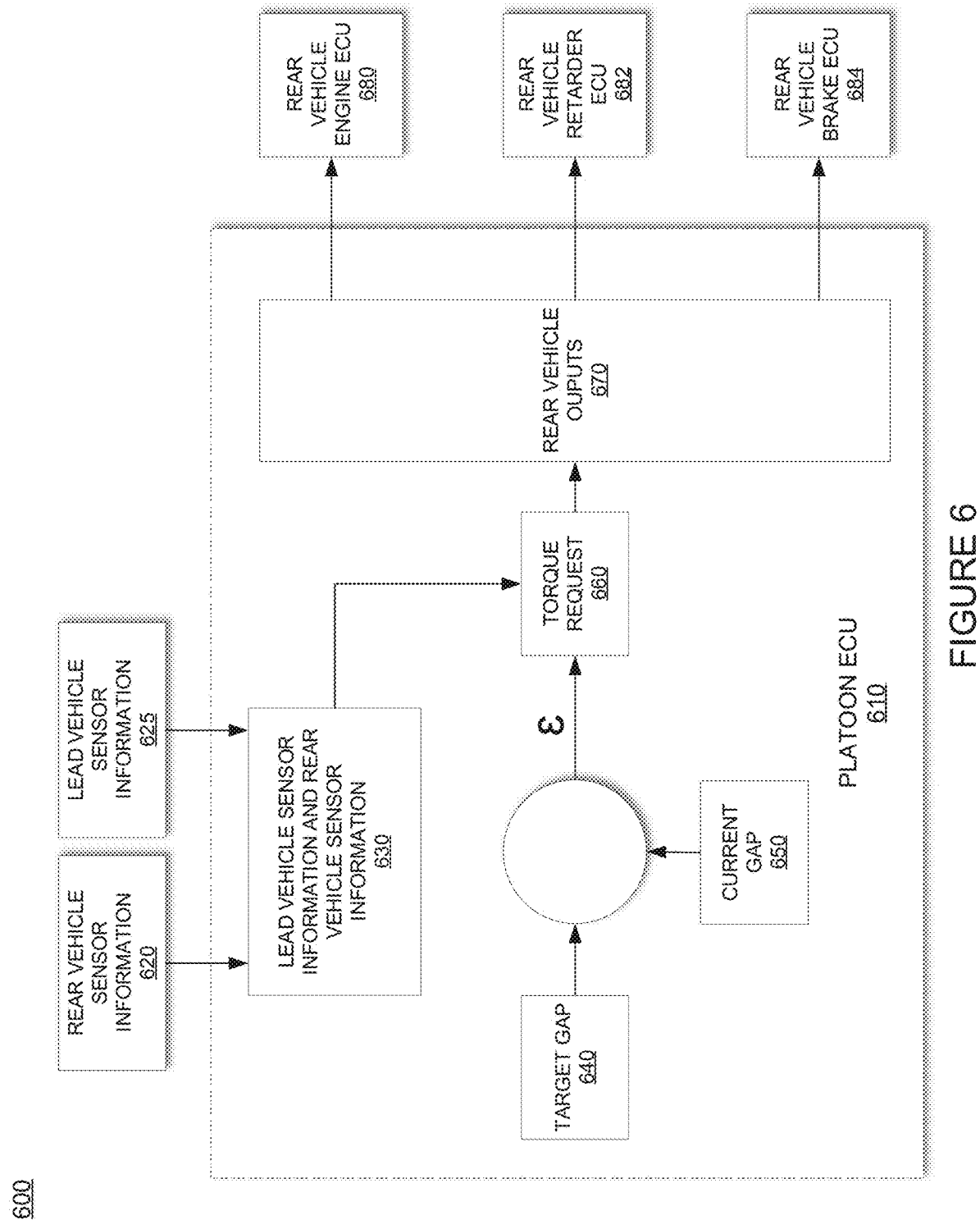
FIG. 6 illustrates a block diagram of a platooning system, in accordance with some embodiments.

Moving on to FIG. 6, an example system 600 for requesting torque from a rear vehicle (e.g., vehicle 220 of FIG. 2) is shown. In example system 600, rear vehicle sensor information 620 is combined with lead vehicle sensor information 625 to create lead vehicle sensor information and rear vehicle sensor information 630. In some embodiments, combining the two sets of information may occur in a platoon ECU 610. However, it should be appreciated that some or all of the components shown in platoon ECU 610 may be located external to platoon ECU 610. This information can be used to assist in creating/maintaining a gap between two vehicles (e.g., a target gap, a minimum gap, a maximum gap, a threshold gap), which can also be determined in platoon ECU 610 in some embodiments. The gap between two vehicles can be a distance between one or more portions of a lead vehicle (e.g., vehicle 210 from FIG. 2) and one or more portions of a rear vehicle. For example, as described above, a gap may be the distance between the front of a rear vehicle and the rear of a lead vehicle. Of course, as described above, a gap may be based on time (e.g., time headway). Herein the term gap may refer to either and be used interchangeably.

To determine a gap, information is typically already transmitted on the CAN bus, and based on that information estimates are made. In various embodiments, rear vehicle sensor information may include data received from one or more sensors that may be used to determine a gap between a lead vehicle and a rear vehicle. Such sensors may include ultrasonic sensor(s), radar(s), and/or LIDAR(s) (e.g., mechanical-mirror, 3D flash, optical phase array, and/or solid-state). Other information that can be obtained from the lead and rear vehicles includes, but is not limited to: wheel speed(s), whether brakes are in use, current speed, current engine torque, etc.

As shown in example system 600, a calculation is performed to determine the difference between target gap 640 and current gap 650. For example, a calculation may include subtracting a target gap from a current gap, and producing an error (e). This error may be greater or less than target gap 640. For example, the error may be substantially 1 meter, 5 meters, 10 meters, etc.

After a difference (e.g., ε) is determined, lead vehicle sensor information 625 and rear vehicle sensor information 620 may be used, in combination with the difference, to create a torque request 660. Once a torque request is determined, it may be provided (e.g., via rear vehicle output module 670) to various ECUs such as rear vehicle engine ECU 680, rear vehicle retarder ECU 682, and/or rear vehicle brake ECU 684. Either one or more of these ECUs, and/or other ECUs, may cause the rear vehicle to either speed up or slow down such that the current gap 650 is closer to, or substantially equal to (e.g., within 1, 2, or 3 meters), target gap 640.

Figure 7:
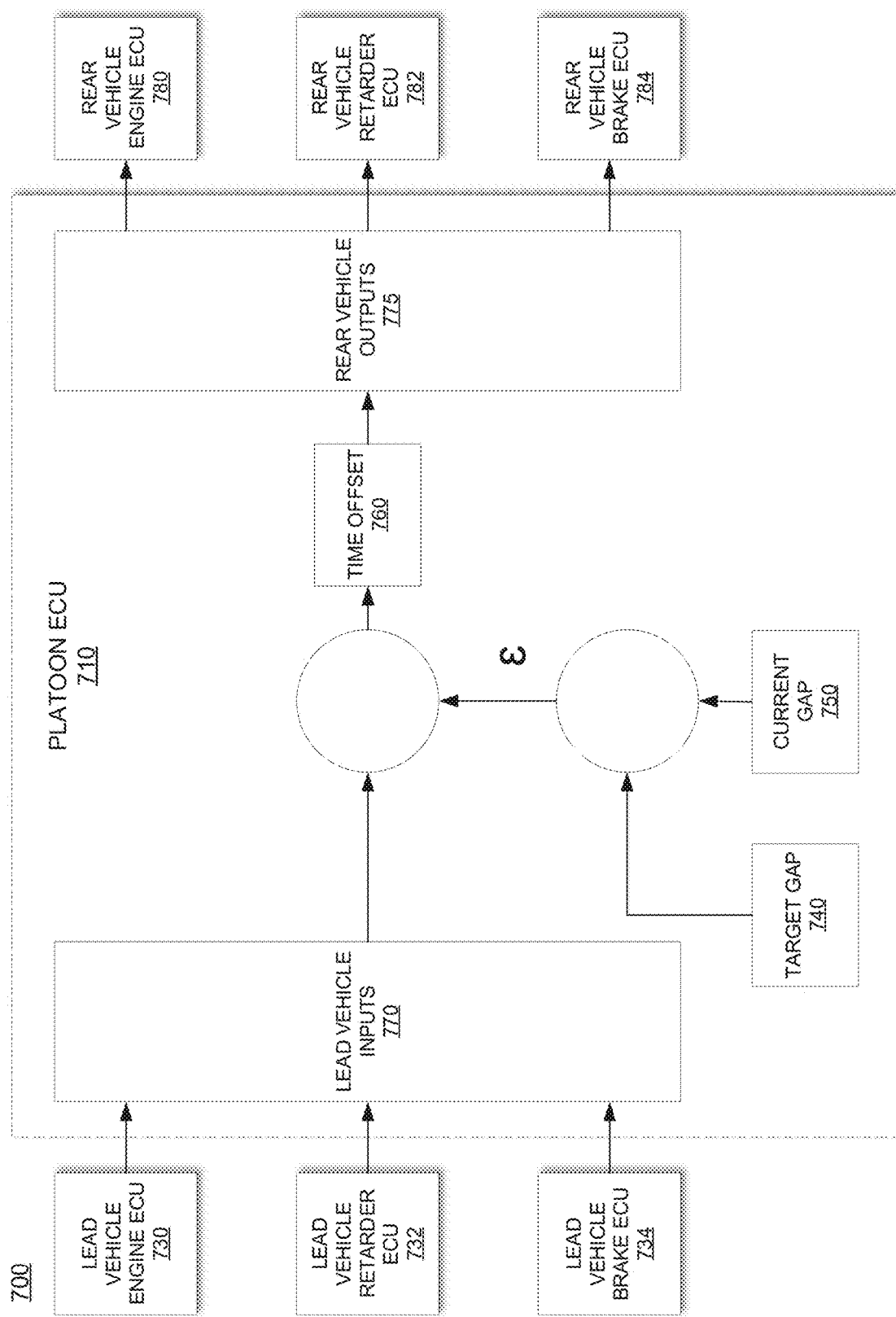
FIG. 7 illustrates a block diagram of a platooning system, in accordance with some embodiments.

FIG. 7 illustrates an example system 700. System 700 is similar to system 600 in that it provides input to the ECUs (e.g., actuator controllers) of a rear vehicle. However, system 700 determines the inputs to the ECUs differently than in system 700.

System 700 includes inputs from a lead vehicle engine ECU 780, a lead vehicle retarder ECU 782, and a lead vehicle brake ECU 784. Of course, more, or fewer, ECUs may provide input to system 700. These inputs 770 may then be digitally transferred to a rear vehicle where they are processed by platoon ECU 710. As with system 600, it should be appreciated that some, all, or none of the example components shown in platoon ECU 710 may be located within platoon ECU 710, and that some, all, or none of the example components shown in platoon ECU 710 may be external to platoon ECU 710.

By communicating the operations performed by individual ECUs from a lead vehicle's ECUs to a rear vehicle's ECUs—as opposed to communicating general information from a lead vehicle to a rear vehicle—at least some of the operations performed by the rear vehicle's ECUs will be much more precise and timely than the operations performed by the rear vehicle's ECUs when using example system 700 as opposed to a system such as example system 600 as described in FIG. 6.

To facilitate ECU to ECU transmission of information, in addition to information about a difference between target gap 740 and current gap 750, information about the time difference between a lead vehicle and a rear vehicle must be factored into calculations before being transmitted to the rear vehicle ECUs. For example, if a first truck starts going up a hill and its engine torque changes and/or its transmission changes gears, then the rear truck will change its engine torque and/or change its transmission's gears a short time after the lead truck performs these operations in order to: (1) account for e, and/or (2) account for the delay in time before the rear truck reaches the former location of the lead truck when the lead truck performed the operations. In some embodiments, a rear vehicle may be able to command an increase in torque in at least one of two ways: (1) a vehicle may command an exact amount of torque (e.g., a request may be sent to an engine ECU for 2,000 N·m and the engine will supply 2,000 N·m); or (2) a vehicle may request an amount of torque from an engine, and the engine may ramp up and then ramp down to the amount of torque requested (e.g., a request may be sent to an engine ECU for 2,000 N·m and the engine will "ramp up" and provide more than 2,000 N·m, and then ramp back down until it only provides 2,000 N·m).

In example system 700, as with system 600, a target gap 740 and a current gap 750 are compared. Unlike example system 600, where the difference (e) is augmented by lead vehicle sensor information and rear vehicle sensor information 630 to control and/or command torque, example system 700 receives lead vehicle inputs 770 from various lead vehicle ECUs, then transmits that information to ECUs on a rear vehicle while taking into account at least e and a time offset. For example, an input to rear vehicle engine ECU may equal the output of a lead vehicle engine ECU while augmented by an amount (e.g., current gap—target gap) plus a time offset. In various embodiments, a time offset may be represented by the equation:

$$\text{Time Offset} = \frac{\text{Target Gap}}{\text{Rear Truck Speed}} \times \text{Gain, where Gain} \propto f(\varepsilon) \quad \text{(Equation 1)}$$

Wherein f(ε) accounts for the error between a target gap and a current gap.

Thus, at platoon ECU 710, e and a time offset may be used to augment data from lead vehicle inputs 770 (e.g., input from the lead vehicle engine ECU 730, input from the lead vehicle retarder ECU 732, and input from the lead vehicle brake ECU 734). This augmented data can then be processed by time offset 760. In other words, data from individual ECUs are augmented by e, and then used as input for time offset 760 to make up for the difference in time that a rear vehicle takes to get to the location that a lead vehicle was at when the lead vehicle's ECUs provided their respective outputs. Further, it should be appreciated that the calculations involving gap error and time offset do not need to be performed in any particular order, and in some embodiments one or both may not be used.

Put another way, the information from the lead vehicle ECUs is received as input for the rear vehicle ECUs. For example, input for rear vehicle engine ECU 780 is based at least in part on output from lead vehicle engine ECU 730; input for rear vehicle retarder ECU 782 is based at least in part on output from lead vehicle retarder ECU 732; and input for rear vehicle brake ECU 784 is based at least in part on output from lead vehicle brake ECU 734. Of course, additional or fewer ECUs may be used in the same manner as those shown in system 700, but are not shown due to space constraints.

Therefore, it should be understood that outputs from a lead vehicle's ECUs may be used for multiple purposes. For example, outputs from a lead vehicle's ECUs may be split such that the output signals are: (1) sent to an actuator in the lead vehicle (e.g., an engine ECU to control torque); and (2) sent wirelessly to a rear vehicle to be used as input for its counterpart ECUs (e.g., a rear vehicle's engine ECU to control torque). Of course, in some embodiments various components such as amplifiers, relays, and/or resistors may be placed in between components such as: (1) a lead vehicle ECU and a lead vehicle actuator; and/or (2) a lead vehicle ECU and a lead vehicle transmitter/transceiver. Such components may be used to reduce noise or amplify a signal such that a normal ECU's output signals can be sent to two or more devices.

Figure 8A:
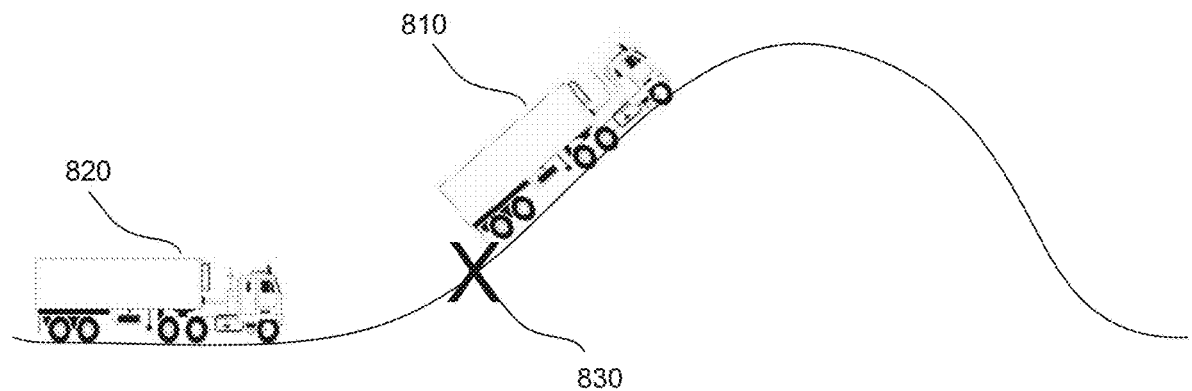
FIG. 8A illustrates two vehicles platooning, in accordance with some embodiments.

Proceeding to FIG. 8A, two example vehicles are shown platooning up a hill. In this example, vehicle 810 is the lead vehicle and has already passed point X 830 on the road. Vehicle 820 is the rear vehicle and has yet to pass point X 830. Often, when a vehicle ascends a hill, it must increase its torque to create the force necessary to reach the top of the hill. In addition, a vehicle may change gears. Thus, in some embodiments engine ECU and transmission ECU data may be required to efficiently/smoothly travel in a platoon. It should be noted that here, and throughout the specification, the term torque may refer to: (1) engine gross torque; (2) engine net torque; (3) wheel torque from an engine; and/or (4) wheel torque from braking-all with or without gear shifting information (e.g., from a transmission ECU).

Figure 8B:
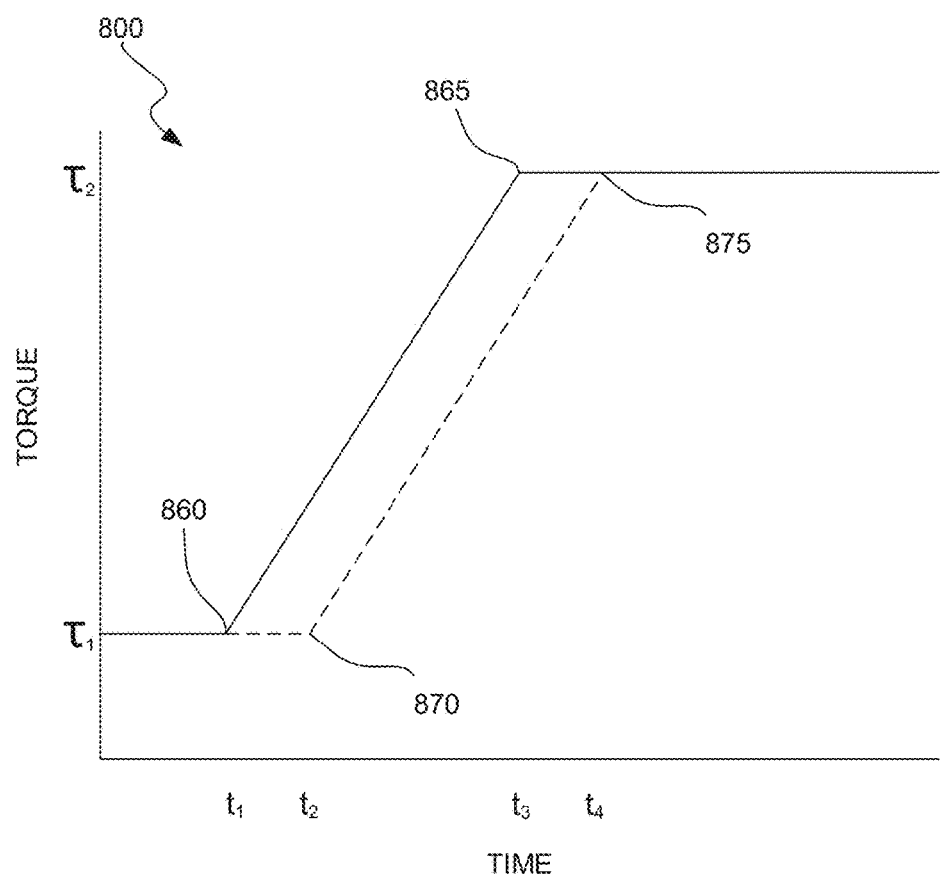
FIG. 8B illustrates a graph representing torque compared to time, in accordance with some embodiments.

FIG. 8B is an example graph 800 that shows the torque (τ) commanded (or controlled) by one or more ECUs in vehicles 810 and 820 over time (t). Graph 800 is intended to illustrate an example platooning situation with respect to FIG. 8A, wherein vehicles 810 and 820 must increase their respective amounts of torque to: (1) reach the top of the hill; and (2) maintain the gap between them.

Accordingly, point 860 on graph 800 indicates a point in time ($t_1$) where vehicle 810 passes point 830 and increases an amount of torque from $\tau_1$ to $\tau_2$ to produce enough force to cause vehicle 810 to make it to the top of the hill. At time t3, the torque produced by vehicle 810 plateaus at $\tau_2$.

As described above, in some embodiments, information associated with torque (e.g., information representative of an amount of torque or a change in an amount of torque) provided by an ECU is wirelessly transmitted from lead vehicle 810 to rear vehicle 820. Based on information associated with torque provided by an ECU in lead vehicle 810, a time offset may be utilized by a system within vehicle 820 (e.g., PECU 710) such that an ECU in rear vehicle 820 may command (or control) torque in rear vehicle 820 to change from $\tau_1$ to $\tau_2$ when rear vehicle 820 reaches point X 830 at time $t_2$ (e.g., point 870 on graph 800). Correspondingly, based on information provided by an ECU on lead vehicle 810, the amount of torque produced by rear vehicle 820 would be $T_2$ at point 875 of graph 800 in this example.

As described above, it should be understood that in some embodiments, information in addition to the output of a lead vehicle's ECU may be used by a platooning system to calculate an input to an ECU that controls torque on a rear vehicle, including, but not limited to: target gap, current gap, lead vehicle speed, rear vehicle speed, lead vehicle weight, and rear vehicle weight.

Figure 9:
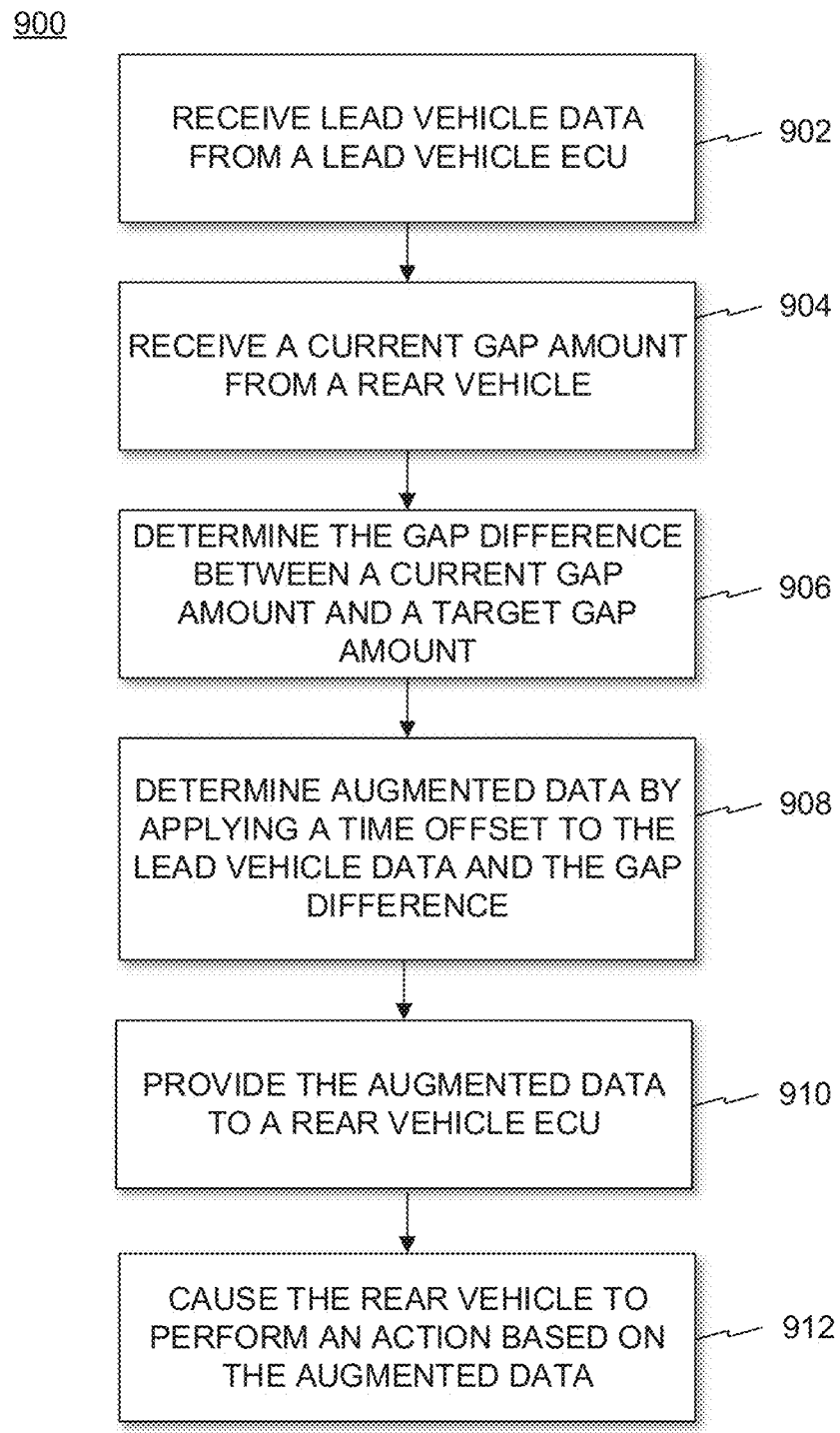
FIG. 9 illustrates a flow chart of an example process, in accordance with some embodiments.

FIG. 9 shows a flowchart 900 of a method for maintaining a relationship between a plurality of vehicles, in accordance with one or more embodiments of the invention. While the various steps in the flowchart is presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 8 should not be construed as limiting the scope of the invention. In one or more embodiments, the steps of FIG. 9 can be performed by example systems 100 and/or 200, and/or the example systems shown in FIGS. 3-7.

In step 902, lead vehicle data is received from a lead vehicle ECU. In various embodiments, data from one or more lead vehicle ECUs may be required by one or more rear vehicle ECUs. Data may be transmitted via DSRC from a lead vehicle to a platooning ECU in a rear vehicle, which may perform operations on the data from the lead vehicle ECU data prior to providing that data to a rear vehicle's ECU(s). Lead vehicle data may include, but is not limited to, data associated with a/an: position, latitude, longitude, altitude, heading, speed, longitudinal and lateral acceleration, relative angle, a blowout, type of load (e.g., type of materials a vehicle is carrying), brake status, brake pressure, a relative location of a kingpin (e.g., as close to the cabin as possible or as far from the cabin as possible while staying properly attached), how a load is balanced (e.g., weights associated with one or more axles, and/or an amount of movement of the rear axles relative to the trailer resting above), load balancing, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, interior lighting, exterior lighting, retarder, anti-lock brakes, emergency braking, engine governor, powertrain, gear ratio, wheel size, wheel type, wheel angle, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, forward looking radar, ultrasonic sensors, road surface, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

It should be appreciated that a rear vehicle may provide the aforementioned information to a lead vehicle (e.g., if a lead vehicle requests such information). In some embodiments a rear vehicle may become a lead vehicle (e.g., if the rear vehicle overtakes the lead vehicle, or if a third vehicle joins the platoon behind the rear vehicle). In such embodiments, a rear vehicle may provide any of the information mentioned above (and more) to any other vehicle via DSRC, a NOC, or any other suitable method.

In step 904, a current gap amount is received from a rear vehicle. In some embodiments, a gap may include a distance measured by actual travel over a road (e.g., a distance of a vehicle traveling where the distance includes bends or turns in a road). Such a gap amount may be determined by one or more of: a radar, ultrasonic sensors, LIDAR, a map, beacons (e.g., on a road, vehicle, building), information related to actual travel over a road (e.g., provided by a lead vehicle), or any combination thereof. Again, a gap may be based on a distance and/or an amount of time.

In step 906, a difference between a current gap amount and a target gap amount is determined. A current gap amount may be useful in determining whether two or more vehicles are platooning in an intended manner. For instance, a current gap may be used to determine whether one vehicle is traveling too close or too far from another vehicle. A target gap may be based on a variety of attributes, including, but not limited to, data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

In various embodiments a target gap may be received by a platoon ECU from a NOC. Sometimes, a target gap may be determined by a platoon ECU based on information from a NOC and information from a lead and/or rear vehicle. For example, a gap may be determined by a location (e.g., which may be used to determine a speed limit), a NOC, and attributes of brakes on a front and/or rear vehicle.

In step 908, augmented data is determined by applying (1) a time offset and (2) the difference between a current gap and a target gap to lead vehicle data. As described herein, it may be advantageous if a rear vehicle performs various actions at a later time than a lead vehicle while maintaining a gap (e.g., staying within a threshold (predefined or dynamic) distance/position/gap of space from a target gap). In some embodiments, a target gap may be predefined and provided by a NOC or a software application (which could be connected to a NOC or located in a vehicle). In some embodiments, a target gap may be dynamic and based on various attributes as described above, such as speed, vehicle weight, wind, torque, brake pressure, and/or traffic conditions.

In step 910, augmented data is provided to at least one rear vehicle ECU. Augmented data may be a combination of data received from at least one ECU in a lead vehicle, a difference between a target gap and a current gap, and a time offset. For example, a lead vehicle may be climbing a hill and request more torque as it is climbing. A rear vehicle may have instructions to maintain a gap, but does not need to increase its torque immediately because the lead vehicle is slowing down as it begins traveling uphill. Thus, a rear vehicle may initially brake to maintain a gap, or it may not brake to stay within a minimum gap. Once the rear vehicle begins climbing uphill, it will request additional torque. Of course, the rear vehicle may request additional torque preemptively based on the lead vehicle's request for torque. In this situation, a rear vehicle may not request torque for a moment based on a time offset (e.g., an amount of time for a rear vehicle to reach the location the lead vehicle was at when it requested more torque), sometimes in combination with the gap difference.

In step 912, a rear vehicle is caused to perform an action based on augmented data. For example, a rear vehicle may request more torque and/or change transmission gears at a certain point in time based on augmented data. A rear vehicle may use its retarder at particular times based on augmented data. A rear vehicle may use a certain ratio of foundation brakes to a retarder based on augmented data. A rear vehicle may follow a trajectory based on augmented data. A rear vehicle may speed up or slow down based on augmented data. A rear vehicle may downshift and brake by a particular amount based on augmented data. A rear vehicle may change lanes based on augmented data.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC, to various ECUs, and to one or more processors. According to various aspects, each of these items may include various kinds of memory, including non-volatile memory, to store one or more programs containing instructions for performing various aspects disclosed herein.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface. Various functions described herein may be provided through a remote desktop environment or any other cloud-based computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for maintaining a relationship between a plurality of vehicles, comprising:

receiving lead vehicle data from a lead vehicle at a rear vehicle platooning electronic control unit (PECU), wherein the lead vehicle data comprises data provided by multiple electronic control units, wherein the multiple electronic control units include: (1) a lead vehicle engine electronic control unit (EECU), (2) a lead vehicle brake electronic control unit (BECU), (3) a lead vehicle transmission electronic control unit (TECU), and (4) a lead vehicle retarder electronic control unit (RECU), and wherein the rear vehicle PECU is remote from a rear vehicle EECU;

receiving a current distance between the lead vehicle and the rear vehicle at the rear vehicle PECU;

receiving a target distance between the lead vehicle and the rear vehicle at the rear vehicle PECU;

determining a distance difference between the target distance and the current distance;

determining a time offset based at least in part on the speed of the rear vehicle and the speed of the lead vehicle;

achieving the target distance between the lead vehicle and the rear vehicle, wherein achieving the target distance is based at least on the distance difference and the time offset.

2. The method of claim 1, wherein the lead vehicle data includes at least an amount of torque.

3. The method of claim 1, wherein the lead vehicle data is transmitted on a first bus connecting either (1) the lead vehicle EECU, (2) the lead vehicle BECU, (3) the lead vehicle TECU, or (4) the lead vehicle RECU to a PECU in the lead vehicle, and wherein the lead vehicle data is transmitted on a second bus in the lead vehicle in response to the lead vehicle data transmitted on the first bus slowing down.

4. The method of claim 3, wherein lead vehicle data is transmitted on both the first bus and the second bus based on determinations made by an arbitrator in the lead vehicle.

5. The method of claim 4, wherein decisions made by the arbitrator on the lead vehicle are based on attributes of brakes of the rear vehicle.

6. The method of claim 1, wherein the rear vehicle EECU receives data from the rear vehicle PECU, and wherein the rear vehicle EECU is controls engine torque of an engine in the rear vehicle.

7. The method of claim 1, wherein the rear vehicle data is based at least on one or more sensors.

8. The method of claim 1, wherein the target distance is received at the rear vehicle PECU from a network operations center (NOC).

9. The method of claim 1, wherein at least one of the vehicles's powertrain comprises an electric motor.

10. A method for communicating information between vehicles, comprising:

receiving first vehicle data from a first vehicle at a platooning electronic control unit (PECU) included in a second vehicle, wherein the first vehicle data contains at least in part torque data, and wherein the first vehicle data comprises data provided by a first vehicle engine electronic control unit (EECU), a first vehicle brake electronic control unit (BECU), a first vehicle transmission electronic control unit (TECU), and a first vehicle retarder electronic control unit (RECU), and wherein the PECU included in the second vehicle is remote from an EECU included in the second vehicle; and determining at least one action at the second vehicle based in part on the received first vehicle data.

11. The method of claim 10, further comprising:
maintaining a gap between the first vehicle and the second vehicle.

12. The method of claim 11, wherein maintaining a gap comprises acceleration and braking.

13. The method of claim 11, wherein maintaining a gap comprises maintaining a speed.

14. The method of claim 10, wherein at least one vehicle comprises an electric motor as part of its drivetrain.

15. A system for maintaining a target gap between a plurality of vehicles, the system comprising:

a first vehicle configured to transmit data, wherein the data is at least in part provided by an engine electronic control unit (EECU) included in the first vehicle, a brake electronic control unit (BECU) included in the first vehicle, (3) a transmission electronic control unity (TECU) included in the first vehicle, and (4) a retarder electronic control unit (RECU) included in the first vehicle, and wherein the data is at least in part associated with an amount of torque; and a second vehicle configured to receive the data at a platooning electronic control unit (PECU) included in the second vehicle, wherein the PECU included in the second vehicle is remote from an EECU included in the second vehicle, and wherein the second vehicle performs an action based at least in part on the transmitted data and information associated with a target gap.

16. The system of claim 15, wherein the information associated with the target gap comprises a difference between the target gap and a current gap.

17. The system of claim 15, wherein the data is transmitted on a second bus included in the first vehicle in response to rate of the data being transmitted on a first bus included in the first vehicle slowing down.

18. The system of claim 16, wherein the performing of an action comprises commanding an amount of torque.

19. The system of claim 15, wherein the performing of an action comprises controlling an amount of torque.

* * * * *